United States Patent
Ma et al.

(10) Patent No.: US 10,809,169 B2
(45) Date of Patent: Oct. 20, 2020

(54) SYSTEM AND METHOD FOR IN-SITU TESTING OF MECHANICAL PROPERTIES OF MATERIALS IN STATIC AND DYNAMIC LOAD SPECTRA

(71) Applicant: Jilin University, Changchun (CN)

(72) Inventors: Zhichao Ma, Changchun (CN); Hongwei Zhao, Changchun (CN); Luquan Ren, Changchun (CN); Shizhong Zhang, Changchun (CN); Jingshi Dong, Changchun (CN); Zunqiang Fan, Changchun (CN); Daining Fang, Changchun (CN); Jingchun Ma, Changchun (CN); Yongmao Pei, Changchun (CN); Qixun Zhang, Changchun (CN); Hui Fan, Changchun (CN); Qingwei Zhuang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 108 days.

(21) Appl. No.: 16/316,321

(22) PCT Filed: Oct. 12, 2016

(86) PCT No.: PCT/CN2016/101836
§ 371 (c)(1),
(2) Date: Jan. 8, 2019

(87) PCT Pub. No.: WO2018/006504
PCT Pub. Date: Jan. 11, 2018

(65) Prior Publication Data
US 2020/0124510 A1    Apr. 23, 2020

(30) Foreign Application Priority Data
Jul. 8, 2016    (CN) .......................... 2016 1 0533810

(51) Int. Cl.
*G01N 3/32*     (2006.01)
*G01N 3/00*     (2006.01)
(Continued)

(52) U.S. Cl.
CPC ................. *G01N 3/08* (2013.01); *G01N 3/04* (2013.01); *G01N 3/068* (2013.01); *G01N 3/24* (2013.01);
(Continued)

(58) Field of Classification Search
CPC .. G01N 2203/0284; G01N 3/24; G01N 33/38; G01N 2203/0085;
(Continued)

(56) References Cited

U.S. PATENT DOCUMENTS 4,885,941 A * 12/1989 Vardoulakis ............. G01N 3/08
                                                        73/794
5,279,166 A      1/1994 Ward et al.
(Continued)

FOREIGN PATENT DOCUMENTS

CN     101520389 A     9/2009
CN     102288501 A     12/2011
(Continued)

OTHER PUBLICATIONS

International Search Report issued in International Application No. PCT/CN2016/101836 dated Apr. 6, 2017 (2 pages).
(Continued)

*Primary Examiner* — Brandi N Hopkins
(74) *Attorney, Agent, or Firm* — Osha Liang LLP

(57) ABSTRACT

A system for in-situ testing of mechanical properties of materials in static and dynamic load spectra, that includes: an Arcan biaxial clamping subsystem, a press-in test subsystem, a biaxial fatigue test subsystem, a biaxial pretension loading subsystem, a signal detection subsystem,
(Continued)

and a support and adjustment subsystem. A combined guide mechanism in the Arcan biaxial clamping subsystem is rigidly connected to a guide mechanism support block, an x-direction three sensor base and a y-direction force sensor base in the support and adjustment subsystem by threaded connections, respectively. A laser transmitter, a voice coil motor and a laser receiver in the press-in test subsystem are rigidly connected to a two-degree-of-freedom electric moving platform for the laser transmitter, a two-degree-of-freedom electric moving platform for the voice coil motor and a two-degree-of-freedom electric moving platform for the laser receiver in the support and adjustment subsystem by threaded connections, respectively.

10 Claims, 12 Drawing Sheets

(51) Int. Cl.
  *G01N 3/02* (2006.01)
  *G01N 3/08* (2006.01)
  *G01N 3/04* (2006.01)
  *G01N 3/06* (2006.01)
  *G01N 3/24* (2006.01)

(52) U.S. Cl.
  CPC ............... *G01N 2203/0003* (2013.01); *G01N 2203/0016* (2013.01); *G01N 2203/0025* (2013.01); *G01N 2203/0073* (2013.01)

(58) Field of Classification Search
  CPC ............ G01N 2203/0268; G01N 3/08; G01N 2203/0254; G01N 33/42; G01N 33/24; G01N 2203/0016; G01N 2203/0066; G01N 2203/0075; G01N 2203/0494; G01N 3/32; G01N 2203/0062; G01N 2203/0073; G01N 2203/0226; G01N 2203/0282

See application file for complete search history.

(56) References Cited

U.S. PATENT DOCUMENTS

| | | | | |
|---|---|---|---|---|
| 7,204,160 B1* | 4/2007 | Sadegh | .................. | G01N 3/10 |
| | | | | 73/862.041 |
| 8,082,802 B1* | 12/2011 | Sadegh | .................. | G01N 3/08 |
| | | | | 73/760 |
| 9,423,329 B2* | 8/2016 | Takeda | .................. | G01N 3/08 |

FOREIGN PATENT DOCUMENTS

| | | |
|---|---|---|
| CN | 104502202 A | 4/2015 |
| CN | 104897468 A | 9/2015 |
| CN | 104913974 A | 9/2015 |
| EP | 1061353 A2 | 12/2000 |

OTHER PUBLICATIONS

Written Opinion issued in International Application No. PCT/CN2016/101836 dated Apr. 6, 2017 (3 pages).

* cited by examiner

SYSTEM AND METHOD FOR IN-SITU TESTING OF MECHANICAL PROPERTIES OF MATERIALS IN STATIC AND DYNAMIC LOAD SPECTRA

TECHNICAL FIELD

One or more embodiments relate to a field of mechanical testing, in particular to a system for in-situ testing of mechanical properties of materials in static and dynamic load spectra and an in-situ test method for the same, in particular to a material microscopic in-situ mechanical testing system integrating a plurality of static and dynamic testing functions. The system has several test modes such as a biaxial tension test mode, a biaxial fatigue test mode, a biaxial tension-shear test mode, an impact pressure test mode, etc., and can be integrated with an optical imaging systems or a digital speckle strain analysis systems to conduct research on fatigue failure mechanism and performance weakening law of the material under complex stress conditions, so as to provide testing tools for optimizing the material preparation process and improving the service reliability of the structure.

BACKGROUND

A material and a product made by the material under service conditions are complex and variable in terms of their stress form and physical environment, and are often subjected to static and dynamic loads, such as tensile loads, shear load and impact load. The macroscopic failure of the material caused by the load is attributed to the damage and evolution of the microstructure thereof under service conditions. It is difficult for a conventional testing technology for mechanical properties of material to reveal the relationship between the mechanical behavior and the microstructure of the material under complex service conditions. In other words, it is impossible to conduct in-depth research on the deformation damage mechanism and performance evolution law of materials and their products. Due to the unclear relationship between the microstructure evolution and mechanical properties of materials, the service safety and reliability of critical materials are insufficient, and the structural failures caused by them are numerous.

When the material and its products are subjected to alternating loads, although the magnitudes of the loads are much lower than the yield strength or tensile strength of the material and its products, after repeated and long-term deformation accumulation, the ultimate fracture failure is usually caused by the fatigue failure. Due to the lack of in-depth study of the fatigue failure mechanism of the material and the microscopic mechanical properties of the fatigue, various accidents caused by the fatigue failure of the material always inflict huge financial losses due to the unpredictability and great destructiveness of these accidents. The failure of the structure under load is mostly attributable to the fatigue failure of the material induced by the alternating load. In the aerospace field, the fatigue failure of the component under severe service conditions such as high temperature and heavy load happens all the time. Due to the unclearness of the microscopic fatigue failure mechanism and performance weakening law of the material, various accidents caused by the fatigue failure of the material always inflict huge financial losses due to the unpredictability and great destructiveness of these accidents. Most of the components are not subjected to a single load under their service conditions. The failure and damage thereof are mostly the combined effect of multiple types of external loads. The same material exhibits very different mechanical behaviors under different load modes. Therefore, in order to improve the service safety and reliability of critical structural materials, it is a kind of urgent need of the economic development and technology progress to study the technology that can effectively evaluate the material failure mechanism and microstructure evolution.

In the traditional research mode of mechanical properties of materials, the test of mechanical properties is usually carried out independent of the characterization of microstructures. It is impossible to obtain the real-time and dynamic micro-domain deformation behavior of materials under the load on the micro-nano scale. With the rapid development of related technologies, such as optical imaging technology, electron microscopy technology and digital image technology, an in-situ mechanical testing technology, which can achieve high-resolution visual dynamic monitoring of material deformation damage and structural changes, is widely used. Correlation between structural evolution behavior of materials and loading effects on the micro-nano scale is achieved by above mentioned technology. In-situ tensile testing techniques are widely used, and MIT, Cambridge University's Cavendish Laboratory, Federal institute of Technology (EPFL), and French National Academy of Sciences (CNRS) have achieved representative research results. Existing in-situ tensile testing of solid materials can be divided into two main categories: one is to prepare microscale test pieces and test devices by means of microelectromechanical systems (MEMS) and focused ion beam (FIB) techniques, and to conduct research on low-dimensional materials by a scanning, electron microscopy (SEM) or a transmission electron microscopy (TEM); the other is to conduct research on three-dimensional block materials with characteristic dimensions of millimeters or sub-millimeters. In general, during the preparation of micro-components, through the process of "mask, corrosion, deposition." and other processes, the size of the test piece is small (below micron or sub-micron level), the test results are significantly dispersive, and the size effect is different from the mechanical properties of the block material. Therefore, the mechanical properties of the three-dimensional block test piece cannot be accurately evaluated by the test results of the low-dimensional components. For larger three-dimensional block materials, companies such as Kammrath & Weiss in Germany, Deben company in GB, and MTI instruments in the United States are among the few companies with complete development ability of in-situ tensile testing systems. The clamping mechanism of some models of these companies does not even consider the design of the neutral positioning of the test piece, but it is still widely used in the field of characterization and testing of block materials.

For the in-situ fatigue test, since the commercial fatigue test equipments are mostly large in size and difficult to be compatible with the imaging device, they generally do not have the function of in-situ testing on the other hand, although the miniaturized in-situ tensile test platform can achieve the reciprocating stretching and compression action, it is limited by the rotary inertia of the servo motor, the speed reduction mechanism and the transmission mechanism, and the miniaturized in-situ tensile test platform generally can only be applied to the low cycle fatigue test which does not require high loading frequency. However, the current subjects, the fatigue failure behavior of which at the micro-scale is studied, are mostly the fatigue fracture opening formed by the non-in-situ test, and the in-situ study of the slip and the micro-crack nucleation at the micro-region defect of the material is lacking. Therefore, the in-situ fatigue test technology faces miniaturization of the structure and increase of the test frequency. Piezoelectric devices are used in in-situ fatigue mechanics testing of micro-scale components due to their fast response, small size, and high reliability. The flexible hinge mechanism of large stiffness in the piezoelectric actuator tends to weaken the output displacement of the piezoelectric device, whereas the flexible hinge of small stiffness is difficult to achieve a fast response at a higher loading frequency due to its inertial load. Therefore, the design of the flexible mechanism requires a reasonable match between its stiffness and output capability. On the other hand, under high temperature and high frequency service conditions, the piezoelectric device will attenuate the output displacement due to its own temperature rise and charge accumulation. Therefore, reasonable fatigue cycle time and residual charge release are key factors to realize the piezoelectric drive-based in-situ fatigue testing.

In addition, the stress form of many components under actual working conditions is a combined effect of various loads, such as tensile load, shear load, impact indentation load, etc. In other words, the actual service state of the material is the composite stress state. At present, the in-situ test research on the composite stress mode of block materials is mostly static test, which is particularly limited to, first; a biaxial tension test based on electro-hydraulic servo technology, second: a compression-bending composite stress test using cantilever structure, and third tension-shear composite stress test achieved based on Arcan clamping tools. In 2013, SM Gao et al, used three-dimensional digital speckle measurement technology to obtain the micro region strain of fabric composite material under compression bending composite stress, and proposed a method for predicting stress-strain constitutive relations in different axial directions of test piece under significant strain conditions. S. Ackermann et al. constructed the plane stress state of phase-induced plasticity steel by using a biaxial electro-hydraulic servo drive technology, and analyzed the fatigue failure behavior of the cast steel by means of different surface crack defect forms. For the in-situ test of tension-shear composite stress, M. Arcan of Tel Aviv University in Israel proposed in 1977 to construct a plane stress state by using a method in which the tensile axis and the axis of the butterfly test piece form an acute angle. Arcan clamping mechanism is simple in terms of structure, and it can obtain a variety of plane stress states by changing the axis offset angle, which provides a powerful tool for studying the mechanical behavior of anisotropic materials. Based on the improved Arcan clamping tool, J. Y. Cognard of the National Naval Engineering Institute of France and J. H. Yan of the University of South Carolina of the United States respectively built a test system under CCD, and studied the interlayer peeling behavior of composite materials. Most of the above research work uses the vector synthesis and decomposition method to decouple the tension-shear composite stress state, and rarely mentions the fatigue and press-in testing techniques based on complex planar stress state.

In summary, for the development trend and existing limitations of in-situ fatigue test technology under composite load, and for the urgent need to improve the service safety and reliability of critical structural materials, it is necessary to design a fatigue test technology, which has a function of applying and coupling a plurality of static and dynamic loads, and is compatible with optical imaging components or digital speckle strain analysis systems. In addition, there is important theoretical and practical value to develop a quasi-static press-in test or impact press-in test based on a plurality of initial stress states, by means of a developed system integrating multiple static and dynamic testing functions.

SUMMARY

One or more embodiments provide a system for in-situ testing of mechanical properties of materials in static and dynamic load spectra and testing method. A length, a width and a height of a mechanical body unit of one or more embodiments are 590 mm, 578 rum and 392 mm, respectively. The system is compatible with an optical imaging system with a multi-degree-of-freedom adjustment function and a 3D digital speckle strain analysis system. In addition, the system has a single-axial (biaxial) tension testing function, a single-axial (biaxial) fatigue testing function, a quasi-static press-in testing function, an impact press-in testing function among other functions. The system can also achieve various composite load test modes, such as a single axial (biaxial) tension-shear composite load test mode, a fatigue test mode based on the single-axial (biaxial) tension-shear composite load, and a press-in test mode based on complex planar stress states. One or more embodiments can construct a plurality of plane stress states by a modified Arcan clamping mechanism in combination with a piezoelectric driving subsystem and a biaxial pre-tension subsystem, and can achieve the press-in test method based on a voice coil motor, and also can realize testing and evaluation of mechanical properties of the material under complicated service conditions. At the same time, a surface prefabricated defect is obtained by the press-in test method such that one or more embodiments can also provide a testing tool for studying the evolution behavior of micro defects.

The above mentioned purposes can be achieved by the following one or more embodiments.

A system for in-situ testing of mechanical properties of materials in static and dynamic load spectra, comprising: an Arcan biaxial clamping subsystem, a press-in test subsystem, a biaxial fatigue test subsystem, a biaxial pre-tension loading subsystem, a signal detection subsystem, and a support and adjustment subsystem, wherein a combined guide mechanism in the Arcan biaxial clamping subsystem is rigidly corrected to a guide mechanism support block, a x-direction force sensor base and a y-direction force sensor base in the support and adjustment subsystem, by threaded connections, respectively; a laser transmitter, a voice coil motor and a laser receiver in the press-in test subsystem are rigidly connected to a two-degree-of-freedom electric moving platform for the laser transmitter, a two-degree-of-freedom electric moving platform for the voice coil motor and a two-degree-of-freedom electric moving platform for the laser receiver in the support and adjustment subsystem by threaded connections, respectively, wherein the two-degree-of-freedom electric moving platform for the voice coil motor is mounted onto a beam of a gantry column by a platform fastening bolt; a x-direction fatigue flexible hinge and a y-direction fatigue flexible hinge in the biaxial fatigue test subsystem are rigidly connected to the guide mechanism support block in the support and adjustment subsystem and one of force sensor connection components in the signal detection subsystem by means of fatigue fastening bolts, respectively; a y-direction fixing base, a cantilever support seat, a worm shaft base and a x-direction screw support seat in the biaxial pre-tension loading subsystem are rigidly connected to a base in the support and adjustment subsystem by threaded connections, respectively; a horizontal laser displacement sensor I and a horizontal laser displacement sensor II in the signal detection subsystem are rigidly connected to an improved Arcan clamping tool in the Arcan biaxial clamping subsystem, a contact displacement sensor I and a contact displacement sensor II in the signal detection subsystem are rigidly connected to the improved Arcan clamping tool in the Arcan biaxial clamping subsystem by means of a displacement sensor moving rod support and a displacement sensor body support, respectively, an indentation laser displacement sensor in the signal detection subsystem is rigidly connected to a stationary outer wall of the voice coil motor in the press-in test subsystem, a plane reflector and an indentation plane reflector in the signal detection subsystem are adhesively connected to the improved Arcan clamping tool in the Arcan biaxial clamping subsystem and an outer layer of a stationary wedge ring in the press-in test subsystem, and a y-direction force sensor in the signal detection subsystem is fastened to a y-direction force sensor base by means of a force sensor fastening nut.

The Arcan biaxial clamping subsystem comprises four improved Arcan clamping tools orthogonally arranged and mounted in a common plane, force sensor connection components, a combined guide mechanism and a synchronizing handle; wherein relative positions between the four improved Arcan clamping tools keep unchanged, and the four improved Arcan clamping tools have annular grooves of identical width, and geometric circles of four annular grooves share a common circle center; which is a geometric center point of a cruciform test piece to be tested; the improved Arcan clamping tools are connected to a x-direction force sensor and the y-direction force sensor by means of the force sensor connection components, and are moved circumferentially about a symmetry axis of the four annular grooves of the improved. Arcan clamping tools via cylindrical pins; the synchronizing handle and the combined guide mechanism synchronously adjust the improved Arcan clamping tools in a plane and guide the relative positions of the improved Arcan clamping tools in a plane, respectively.

The four improved Arcan clamping tools are symmetrically mounted around the geometric center point of a cruciform test piece, gaps between each two adjacent improved Arcan clamping tools are uniform; an angle between the cruciform test piece located in a horizontal plane and an axis of a x-direction ball screw or an axis of a y-direction ball screw is adjusted by means of the combined guide mechanism having both linear and circular guiding functions; the four improved Arcan clamping tools have the annular grooves identical to one another, an outer diameter of the cylindrical pin is smaller than the width of the annular groove, the annular groove of the improved Arcan clamping tool and the cylindrical pin are pre-formed with curved guide surfaces having the same radius of curvature at a center of thickness and height direction, along a circumferential direction of the annular groove of the improved Arcan clamping tool and a circumferential direction of the cylindrical pin, respectively, and the curved wide surface and a hardened steel ball having the same radius of curvature are in spherical contact with each other so as to weaken frictional resistance applied to the improved Arcan clamping tool during a movement thereof in a circumferential direction of the improved Arcan clamping tool during the test process; an relative angle between the clamping tools and an axis of the ball screw is maintained by the force sensor connection components after a free setting of the relative angle, so as to implement a loading mode of the cruciform test piece at any acute angle with respect to an axis of the ball screw; when the relative angle is 0°, the cruciform test piece is subjected to an axial tensile load, which is a biaxial tension test mode, and when the relative angle is an acute angle, a central region of the cruciform test piece has a change in view of relative positions thereof due to a shear movement, the cruciform test piece is actually in a biaxial tension-shear plane stress state; at the same time, an end of the improved Arcan clamping tool for clamping the test piece has a convex structure of a shape conforming to a shape of a circular transition portion of the cruciform test piece, and the convex structure has a thickness larger than that of the cruciform test piece, so as to achieve centering of the cruciform test piece in two orthogonal stretching directions in an arcuate-contact positioning manner; and the synchronizing handle has a pair of symmetrical locating pins having a diameter that is consistent with the width of the annular groove of the improved Arcan clamping tool, and an axial spacing between the pair of locating pins is consistent with a distance between circle centers of semicircles of adjacent ends of annular grooves of a pair of adjacent improved Arcan clamping tools, such that when angles between the four improved Arcan clamping tools and an axis of the ball screw are adjusted, two synchronizing handles orthogonally arranged ensures that the four improved Arcan clamping tools are simultaneously adjusted with respect to the axis of the ball screw so as to maintain the relative positions of the four improved Arcan clamping tools during angle adjustment process.

The combined guide mechanism comprises a linear guide rail pair, and a curved guide rail pair configured to simultaneously guide the respective pair of improved Arcan clamping tools in a stretching direction and in a shear direction of the cruciform test piece, respectively; when the four improved Arcan clamping tools moves in relative to one another, the relative acute angle between a geometric axis of the cruciform test piece to be tested and the axis of the ball screw is monotonously decreased with the loading process, that is, the motion of the improved Arcan clamping tools is a combination of linear motion and a planar rotational motion surrounding a geometric midpoint of the cruciform test piece; therefore, the linear guide rail pair is adapted to guide tensile displacement of the cruciform test piece, and the curved guide rail pair is adapted to guide shear displacement of the cruciform test piece, and the curved guide rail pair is formed by a curved guide rail and a curved guide rail platform which are connected together by a curved guide rail slider.

The press-in test subsystem comprises the laser transmitter, the voice coil motor, an indentation force sensor, an indentation plane reflector, the laser receiver, an indentation force sensor nut, and a press head clamping unit, wherein the press head clamping unit comprises a press head, a press head positioning pin, a moveable wedge ring, a stationary wedge ring and a stationary stopping ring; wherein a visible laser of small diameter emitted by the laser transmitter is received in real-time by the laser receiver so as to detect an initial position of the press head in a vertical position; the accuracy of the position of the press head during use is maintained by a wedge-shaped pre-tightening of the press head; one bolt of the indentation force sensor at an end thereof is rigidly connected to a moveable end of the voice coil motor by means of an indentation force sensor nut, and the other bolt of the indentation force sensor at the other end thereof is fastened to the stationary wedge ring of the press head clamping unit by threaded connection;

The laser transmitter and the laser receiver are coaxially mounted so as to form a continuous narrow optical path of a visible beam therebetween, and there is a determined fine pitch between the optical path and an upper surface of the cruciform test piece subjected to polishing process so as to detect an absolute position of a tip of the press head in the vertical direction; in an initial state, the absolute position of the tip of the press head is higher than that of the visible beam, and after the movable end of the voice coil motor performs constant velocity motion or constant acceleration motion, when the tip of the press head interferes with the visible beam, an optical signal of the visible beam cannot be detected by the laser receiver; based on the feedback signal from the laser receiver, the voice coil motor continues to perform a quasi-static constant velocity motion or the constant acceleration motion with a determined stroke under a control of sequence voltage so as to achieve a static press-in test or an impact press-in test of the cruciform test piece;

a cylindrical shank end of the press head and an inner cylindrical surface of the moveable wedge ring are provided with through holes having identical diameters, in a direction perpendicular to an axial direction of the press head and in a direction perpendicular to an axial direction of the moveable wedge ring, respectively; the press head positioning pin is interference-fitted in the through holes such that a relative position between the press head and the moveable wedge ring is fixed; and the moveable wedge ring and the stationary wedge ring are positioned by conical surfaces thereof with the same inclination, and a wide end face of the moveable wedge ring is in surface contact with the stationary stopping ring, and a narrow end face of the stationary wedge ring is rigidly connected to the stationary stopping ring, by threaded connection such that the position of the press head is precisely achieved by wedge positioning.

The biaxial fatigue test subsystem comprises a set of orthogonally arranged x, y-direction piezoelectric drives; the x-direction piezoelectric drive comprises a x-direction piezoelectric stack and a x-direction fatigue flexible hinge; the y-direction piezoelectric drive comprises a y-direction piezoelectric stack and a y-direction fatigue flexible hinge; and the x-direction fatigue flexible hinge and the y-direction fatigue flexible hinge are both of symmetrical arc transition type flexible structure; x and y-direction piezoelectric drives are orthogonally mounted on circumferential outer edges of the improved Arcan clamping tools; and the x-direction piezoelectric stack and the y-direction piezoelectric stack are always under compression, and elastic elongation and recovery thereof provide an alternating stress having stress ratio of 0 for the cruciform test piece to be tested; an enveloped structure of the x-direction fatigue flexible hinge and the y-direction fatigue flexible hinge comprises three sets of flexible thin walls which are arranged in parallel; in a direction perpendicular to a central axis of the x-direction piezoelectric stack or the y-direction piezoelectric stack, the flexibility of the x-direction fatigue flexible hinge or the y-direction fatigue flexible hinge is gradually reduced until it can be regarded as a rigid body; when applying alternating voltages of identical frequency and equal amplitude to the x-direction piezoelectric stack and the y-direction piezoelectric stack, the x-direction fatigue flexible hinge and the y-direction fatigue flexible hinge perform corresponding angular displacements along a flexible joint at their inner walls, the cruciform test piece is also subject to controllable alternating loads of the identical frequency and equal amplitude.

The biaxial pre-tension loading subsystem is achieved as follows: through a swallowtail wedge structure, a x-direction guide rail slider floats above a x-direction linear guide rail rigidly connected to the base; similarly, a the y-direction guide rail slider also floats above a y-direction linear guide rail through a swallowtail wedge structure; a y-direction screw support seat and the y-direction linear guide rail are rigidly mounted on a y-direction fixing base by threaded connection; in addition, a y-direction screw nut is sleeved on a flange of a x-direction ball screw and rigidly mounted on the x-direction guide rail slier together with a x-direction screw nut bracket by threaded connection; an output shaft of a y-direction servo motor and a gear shaft of a y-direction drive spur gear are respectively embedded in a through hole of a flexible coupling so as to transmit an output torque motion of the y-direction servo motor; a flat key is embedded in a key groove of a worm shaft, and positioning faces on both sides of the flat key are in surface contact with spur gear comprising a x-direction spur gear I, a x-direction spur gear II, a y-direction spur gear I and a y-direction spur gear II; and a positioning pin is interference-fitted in an inner hole formed at an axial end of the worm shaft and perpendicular to an axial direction of the worm shaft so as to limit axial movements of the spur gears comprising the x-direction spur gear I, the x-direction spur gear II, the y-direction spur gear I and the y-direction spur gear II; a wormwheel is sleeved on an axial end of a x-direction ball screw or a y-direction ball screw through its inner bore and a wormwheel positioning pin so as to limit rotation freedom thereof; and a bearing inner bore of an outer positioning bearing is interference-fitted on a gear shaft of a x-direction drive spur gear or the y-direction drive spur gear, and a hearing outer ring of the outer positioning hearing is interference-fitted within a bearing housing hole of a worm shaft base, and a retaining ring of the outer positioning bearing is in surface contact with an retaining surface of an outer wall of the worm shaft base so as to limit the axial movement of the gear shaft of the x-direction drive spur gear or the y-direction drive spur gear;

a pair of x-direction ball screws have axes that are coaxial to each other and that are perpendicular to geometric axes of the x-direction spur gear I, the x-direction spur gear II and the x-direction drive spur gear; and both have a helix shape that is right-handed; and the single-stage worm and wormwheel reduction mechanism consisting of the worm and the wormwheel has a gear ratio of 40.

The signal detection subsystem comprises a x-direction force sensor, a y-direction force sensor, a horizontal laser displacement sensor I, a horizontal laser displacement sensor II, a plane reflector, an indentation laser displacement sensor, an indentation force sensor, an indentation plane reflector, a contact displacement sensor I, a contact displacement sensor II, a displacement sensor moving rod support and a displacement sensor body support; wherein a pair of horizontal laser displacement sensors I, II are mounted orthogonal to a pair of contact displacement sensor I, II respectively; and geometric axes of the x-direction force sensor and the y-direction force sensor forms acute angles with symmetry lines between incident light and reflected light of the horizontal laser displacement sensors I, II and also forms acute angles with geometric axes of the contact displacement sensors II.

The support and adjustment subsystem comprises a gantry column, the two-degree-of-freedom electric moving platform for the laser receiver, the guide mechanism support block, a base, the two-degree-of-freedom electric moving platform for the laser transmitter and the two-degree-of-freedom electric moving platform for the voice coil motor, wherein the base is used to support the biaxial pre-tension loading subsystem and the biaxial fatigue test subsystem; and the two-degree-of-freedom electric moving platform for the laser receiver, the guide mechanism support block, the two-degree-of-freedom electric moving platform for the laser transmitter and the two-degree-of-freedom electric moving platform for the voice coil motor rigidly connected to the gantry column are configured to adjust the positions of the laser receiver, the laser transmitter and the voice coil motor in the press-in test subsystem in real time, respectively.

A method for in-situ testing of mechanical properties of materials in static and dynamic load spectra, a stress-strain decoupling method for an Arcan biaxial clamping subsystem and a biaxial pre-tension loading subsystem, characterized in that: a central region and a gauge portion of a cruciform test piece are simplified to a unit body with uniform deformation; when calculating an actual stress and strain caused by each component of loads suffered by the cruciform test piece under a tension-shear plane stress state and a biaxial tension plane stress state, by means of principle of superposition, combined effects of a tension-shear load and a biaxial tension load on the stress and strain of the cruciform test piece are decoupled into a vector coupling superposition of a stress-strain constitutive relation under each single load; taking an elastic elongation, a plastic flow and a cross-section change of a material, in a target load acting direction, caused by other class of loads into consideration, a deformation behavior of the unit body of a simplified model in the target load acting direction is quantitatively described so as to obtain a relationship between the stress and strain under the target load and a known coupling load and a displacement, the decoupling method comprising: for a tension-shear composite stress state, in order to calculate an actual tensile strain and an actual shear strain of the cruciform test piece under an external load, which forms an acute angle to an axial direction of the cruciform test piece, a step of establishing a simplified regular hexahedron model, wherein the simplified regular hexahedron model characterizes the gauge portion of the cruciform test piece, wherein an offset angle formed between an initial geometric axis of the regular hexahedron and a stretching direction is a known parameter, and a length, a width and a height of the regular hexahedron respectively correspond to a length, a width and a thickness of the gauge portion of the cruciform test piece; a step of quantitatively calculating an angle between a geometric axis of a rhombohedron and the initial geometric axis of the regular hexahedron, wherein under the external load coaxial with the stretching direction, the regular hexahedron model is changed to the rhombohedron; and a step of verifying, wherein an actual tensile stress and strain and a shear stress and strain of a cruciform test piece are directly collected and calculated by force sensors and displacement sensors, respectively, and then a respective tensile stress-strain curve and a respective shear stress-strain curve are decoupled, and then the decoupling method can be verified by three-dimensional strain analysis of a digital speckle measurement technique; for a biaxial tension mode, a central region of the cruciform test piece is stretched evenly under an action of plane stress, whereas a width of a parallel beam section gradually decreases in a load acting direction, a quantitative relationship between a deformation distribution and a load effect of the cruciform test piece is established by simulation analysis and image test method.

One or more embodiments have the advantages of compact structure, high test precision wherein the size of the structure main body is of 590 mm×578 mm×392 mm. Compared with the prior art, one or more embodiments can realize a fatigue test based on various biaxial tension-shear pre-stresses, in other words, it can constitute complex static and dynamic load spectra, which can be used to study the law of fatigue crack initiation and fatigue crack propagation of the test piece under a complex pre-stressed state. One or more embodiments can also realize the press-in test based on multi-dimensional plane stress state, in other words, it can obtain the hardness map or Young's modulus map of the test piece subjected to complex stresses by the press-in test. During the test, an initial single point indentation defect or an indentation array can also be prefabricated in different characteristic areas of the cruciform test piece by using the press-in test subsystem, so as to study the evolution behavior and deformation damage mechanism of the micro defect. In addition, one or more embodiments can also independently perform in-situ mechanical testing in single load mode, and has plenty test contents, and has good compatibility with the optical imaging system with the multi-degree-of-freedom adjustment function and the 3D digital speckle strain analysis system, and can provide an evaluation tool to evaluate the weakening law of test piece and an optimized method of manufacturing a kind of material.

One or more embodiments can integrate a static testing function, which is performed by biaxial tension-shear load applied in two orthogonal directions in a plane, a fatigue testing function based on biaxial tension-tension mode, and a static and dynamic press-in testing function, and can achieve the construction of complex static and dynamic load spectra, and also can evaluate the mechanical properties of film materials or block materials under various modes of composite load, such as such as a high cycle fatigue testing based on biaxial pre-tension load and an impact press-in testing based on biaxial tension-shear preload. At the same time, by prefabricating characterized defects in the central region and the cross-arm regions of the test piece, and by means of the analysis function of the variable-fold optical imaging system or the digital speckle strain analysis system, researches on deformation behaviors and crack propagation laws of micro-defects in a component under multi-dimensional stress states can be implemented, and an evaluation tool can be provided for performance degradation laws of products and optimized preparation methods of materials.

BRIEF DESCRIPTION OF THE DRAWINGS

The drawings described herein are intended to provide a further understanding of one or more embodiments, and also constitute a pan of this application. Illustrative examples of one or more embodiments and the descriptions thereof are used to explain one or more embodiments and should not be construed to improperly limit one or more embodiments.

Figure 1:
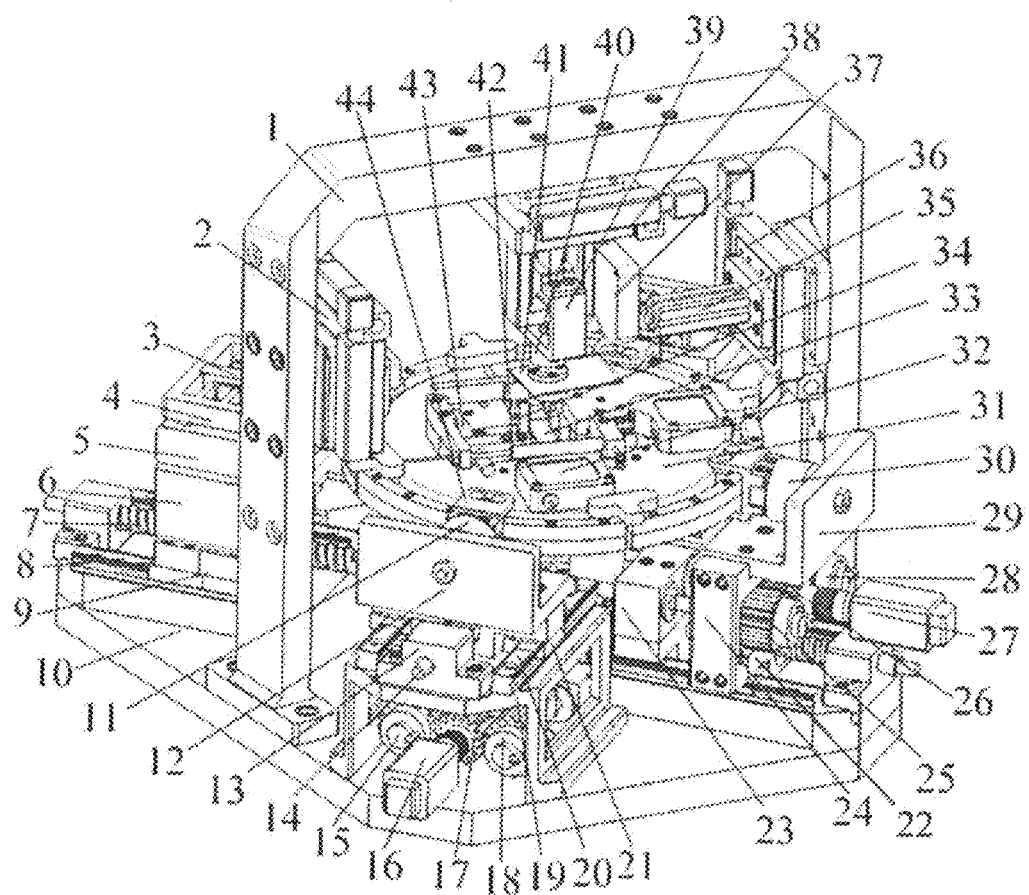
FIG. 1 is a schematic view showing an overall appearance of one or more embodiments.
Figure 2:
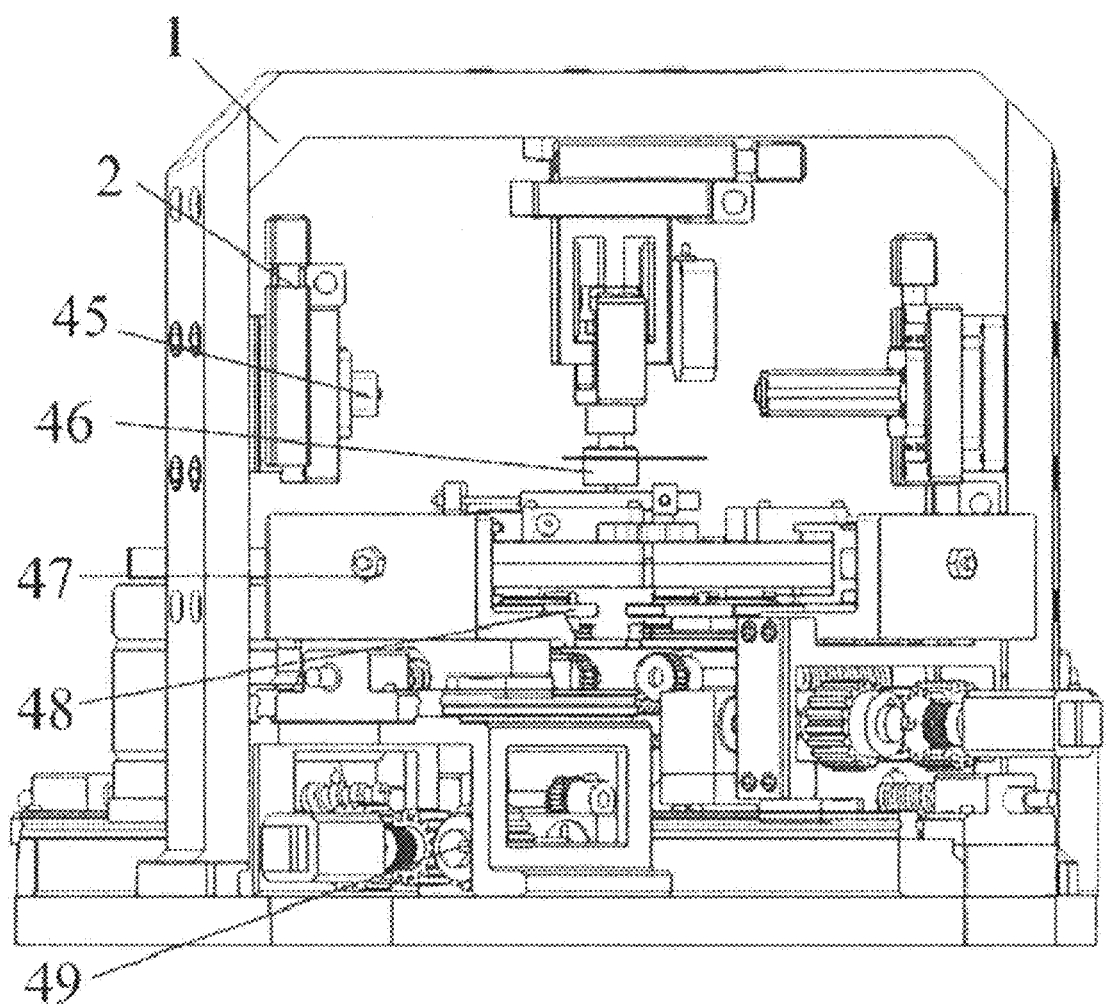
FIG. 2 is a front view of one or more embodiments.
Figure 3:
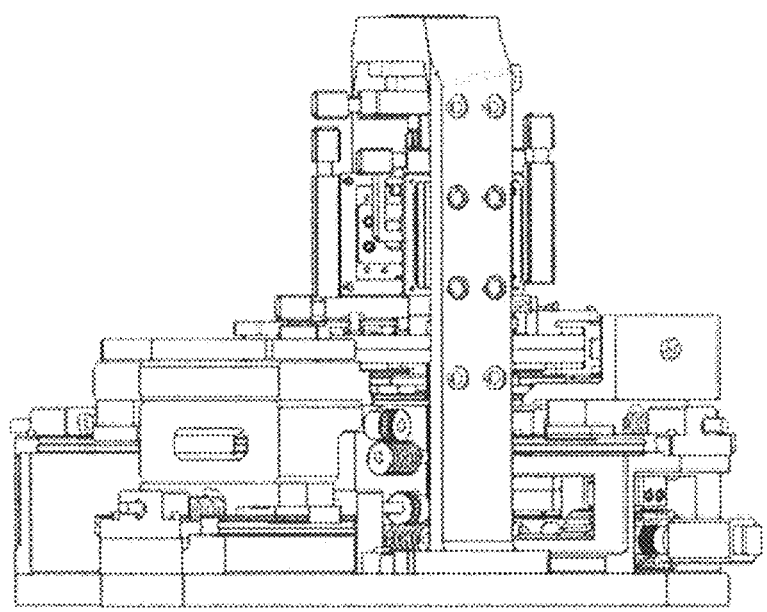
FIG. 3 is a left side view of one or more embodiments.
Figure 4:
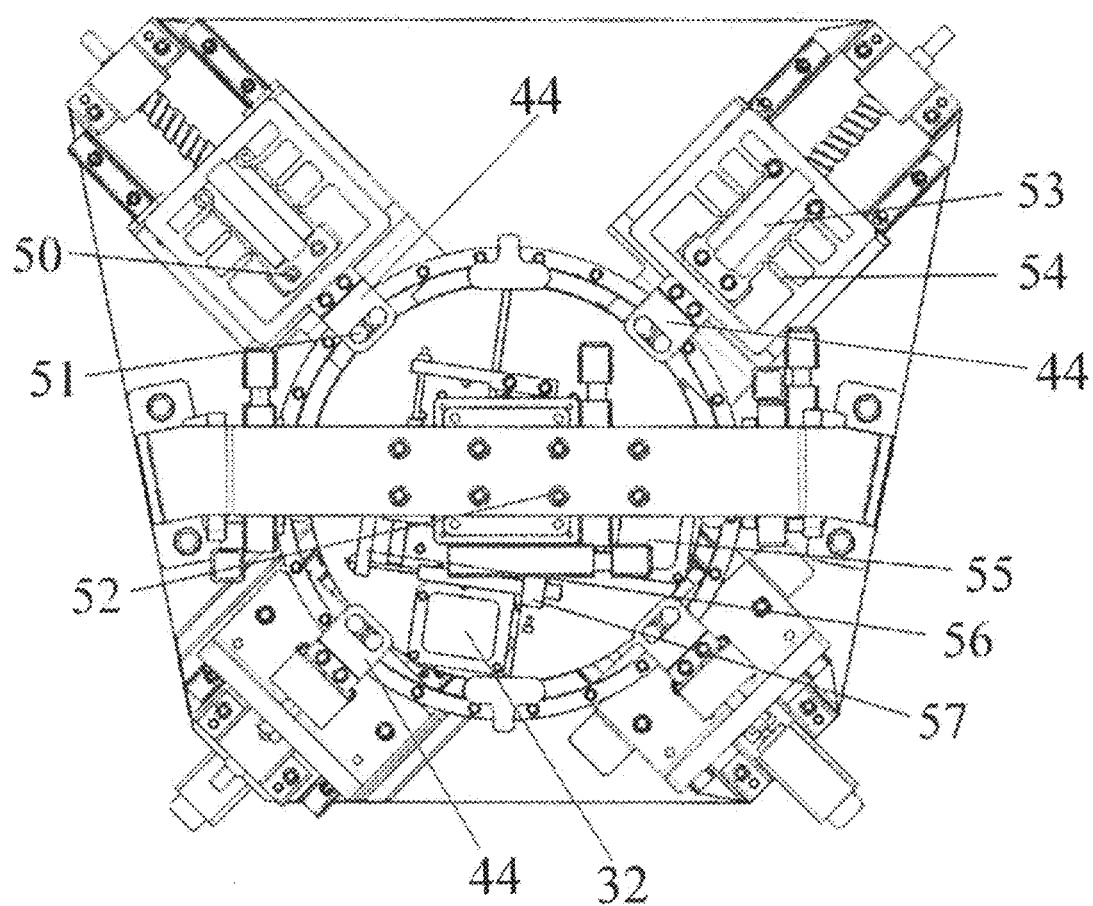
FIG. 4 is a top plan view of one or more embodiments.

wherein 1. gantry column; 2. laser receiver two-degree-of-freedom electric moving platform for laser receiver; 3. x-direction piezoelectric stack; 4. x-direction fatigue flexible hinge; 5. guide mechanism support block; 6. x-direction screw nut; 7. x-direction ball screw; 8. x-direction linear guide rail; 9. x-direction guide rail slider; 10. base; 11. y-direction force sensor; 12. y-direction force sensor base; 13. y-direction screw support seat; 14. y-direction ball screw; 15. x-direction spur gear I; 16. x-direction servo motor; 17. x-direction drive spur gear; 18. x-direction spur gear II; 19. y-direction fixing base; 20. y-direction linear guide rail; 21. y-direction guide rail slider; 22. y-direction screw nut; 23. cantilever support seat; 24. x-direction screw nut bracket; 25. y-direction spur gear I; 26. y-direction drive spur gear; 27. y-direction servo motor; 28. y-direction spur gear II; 29. x-direction force sensor base; 30. x-direction force sensor; 31. improved Arcan clamping tool; 32. horizontal laser displacement sensor I; 33. cruciform test piece; 34. plane reflector; 35. laser transmitter; 36. two-degree-of-freedom electric moving platform for laser transmitter; 37. indentation laser displacement sensor; 38. voice coil motor two-degree-of-freedom electric moving platform for voice coil motor; 39. voice coil motor; 40. indentation force sensor; 41. indentation plane reflector; 42. contact displacement sensor I; 43. contact displacement sensor II; 44. force sensor connection component; 45. laser receiver; 46. press head clamping unit; 47. force sensor fastening nut; 48. combined guide mechanism; 49. flat key; 50. fatigue fastening bolt; 51. cylindrical pin; 52. Platform fastening bolt; 53. y-direction piezoelectric stack; 54. y-direction fatigue flexible hinge; 55. horizontal laser displacement sensor II; 56. displacement sensor moving rod support; 57. displacement sensor body support; 58. synchronizing handle; 59. press head; 60. press head positioning pin; 61. moveable wedge ring; 62. stationary wedge ring; 63. stationary stopping ring; 64. indentation force sensor nut; 65. curved guide rail; 66. curved guide rail platform; 67. curved guide rail slider; 68. worm shaft base; 69. wormwheel positioning pin; 70. worm; 71. wormwheel; 72. x-direction screw support seat; 73. outer positioning bearing; 74. worm shaft; 75. positioning pin; 76. flexible coupling.

DETAILED DESCRIPTION

The details of one or more embodiments are further described below in conjunction with the accompanying drawings.

Referring to FIGS. 1 to 14, in the system for in-situ testing of mechanical properties of materials in static and dynamic load spectra according to one or more embodiments, a body size of a mechanical unit is 590 mm×578 mm×392 mm, and the test system is designed based on an observation conditions of a three-dimensional strain optical measurement system designed by German GOM-ARAMIS and an optical stereo microscope designed by Nikon SMZ745, and the test system is Compatible with other types of video extensometers and optical microscopy imaging systems with continuous zoom function.

Referring to FIG. 1 to FIG. 4, the system for in-situ testing of mechanical properties of materials in static and dynamic load spectra according to one or more embodiments comprises: an Arcan biaxial clamping subsystem, a press-in test subsystem, a biaxial fatigue test subsystem, a biaxial pretension loading subsystem, a signal detection subsystem, and a support and adjustment subsystem. A combined guide mechanism 48 in the Arcan biaxial clamping subsystem is rigidly connected to a guide mechanism support block 5, a x-direction force sensor base 29 and a y-direction force sensor base 12 in the support and adjustment subsystem by threaded connections, respectively; a laser transmitter 35, a voice coil motor 39 and a laser receiver 45 in the press-in test subsystem are rigidly connected to a two-degree-of-freedom electric moving platform 36 for the laser transmitter, a two-degree-of-freedom electric moving platform 38 for the voice coil motor and a two-degree-of-freedom electric moving platform 2 for the laser receiver in the support and adjustment subsystem by threaded connections, respectively, wherein the two-degree-of-freedom electric moving platform 38 for the voice coil motor is mounted onto a beam of a gantry column 1 by a platform fastening bolt 52; a x-direction fatigue flexible hinge 4 and a y-direction fatigue flexible hinge 54 in the biaxial fatigue test subsystem are rigidly connected to the guide mechanism support block 5 in the support and adjustment subsystem and one of force sensor connection components 44 in the signal detection subsystem by means of fatigue fastening bolts 50, respectively; a y-direction fixing base 19, a cantilever support seat 23, a worm shaft base 68 and a x-direction screw support seat 72 in the biaxial pre-tension loading subsystem are rigidly connected to a base 10 in the support and adjustment subsystem by threaded connections, respectively; a horizontal laser displacement sensor I 32 and a horizontal laser displacement sensor II 55 in the signal detection subsystem are rigidly connected to an improved Arcan clamping tool 31 in the Arcan biaxial clamping subsystem, a contact displacement sensor I 42 and a contact displacement sensor II 43 in the signal detection subsystem are rigidly connected to the improved Arcan clamping tool 31 in the Arcan biaxial clamping subsystem by means of a displacement sensor moving rod support 57 and a displacement sensor body support 56, respectively, an indentation laser displacement sensor 37 in the signal detection subsystem is rigidly connected to a stationary outer wall of the voice coil motor 39 in the press-in test subsystem, a plane reflector 34 and an indentation plane reflector 41 in the signal detection subsystem are adhesively connected to the improved Arcan clamping tool 31 in the Arcan biaxial clamping subsystem and an outer layer of a stationary wedge ring 62 in the press-in test subsystem, and a y-direction force sensor 11 in the signal detection subsystem is fastened to a y-direction force sensor base 12 by means of a force sensor fastening nut 47.

Figure 5:
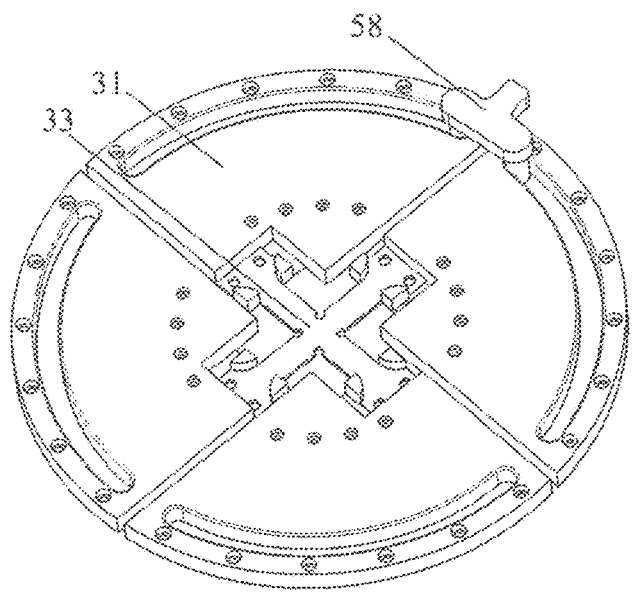
FIG. 5 is a schematic view of an Arcan clamping unit of one or more embodiments.

As shown in FIG. 5, the Arcan biaxial clamping subsystem comprises four improved Arcan clamping tools 31 orthogonally arranged and mounted in a common plane, force sensor connection components 44, a combined guide mechanism 48 and a synchronizing handle 58; wherein relative positions between the four improved Arcan clamping tools 31 keep unchanged, and the four improved Arcan clamping tools 31 have annular grooves of identical width, and geometric circles of four annular grooves share a common circle center, which is a geometric center point of a cruciform test piece 33 to be tested; the improved Alcan clamping tools 31 are connected to a x-direction force sensor 30 and the y-direction force sensor 11 by means of the force sensor connection components 44, and are moved circumferentially about a symmetry axis of the four annular grooves of the improved Arcan clamping tools 31 via cylindrical pins 51; the synchronizing handle 58 and the combined guide mechanism 48 synchronously adjust the improved Arcan clamping tools 31 in a plane and guide the relative positions of the improved Arcan clamping tools 31 in a plane, respectively.

The four improved Arcan clamping tools 31 are symmetrically mounted around the geometric center point of a cruciform test piece 33, gaps between each two adjacent improved Arcan clamping tools 31 are uniform; an angle between the cruciform test piece 33 located in a horizontal plane and an axis of a x-direction ball screw 7 or an axis of a y-direction ball screw 14 is adjusted by means of the combined guide mechanism 48 having both linear and circular guiding functions; the four improved Arcan clamping tools 31 have the annular grooves identical to one another, an outer diameter of the cylindrical pin 51 is smaller than the width of the annular groove, the annular groove of the improved Arcan clamping tool 31 and the cylindrical pin 51 are pre-formed with curved guide surfaces having the same radius of curvature at a center of thickness and height direction, along a circumferential direction of the annular groove of the improved Arcan clamping tool 31 and a circumferential direction of the cylindrical pin 51, respectively, and the curved guide surface and a hardened steel ball having the same radius of curvature are in spherical contact with each other so as to weaken frictional resistance applied to the improved Arcan clamping tool 31 during a movement thereof in a circumferential direction of the improved Arcan clamping tool 31 during the test process; an relative angle between the clamping tools and an axis of the ball screw is maintained by the force sensor connection components 44 after a free setting of the relative angle, so as to implement a loading mode of the cruciform test piece 33 at any acute angle with respect to an axis of the ball screw; when the relative angle is the cruciform test piece is subjected to an axial tensile load, which is a biaxial tension test mode, and when the relative angle is an acute angle, a central region of the cruciform test piece has a change in view of relative positions thereof due to a shear movement, the cruciform test piece is actually in a biaxial tension-shear plane stress state; at the same time, an end of the improved Arcan clamping tool 31 for clamping the test piece has a convex structure of a shape conforming to a shape of a circular transition portion of the cruciform test piece 33, and the convex structure has a thickness larger than that of the cruciform test piece 33, so as to achieve centering of the cruciform test piece 33 in two orthogonal stretching directions in an arcuate-contact positioning manner;

the synchronizing handle 58 has a pair of symmetrical locating pins having a diameter that is consistent with the width of the annular groove of the improved Arcan clamping tool 31, and an axial spacing between the pair of locating pins is consistent with a distance between circle centers of semi-circles of adjacent ends of annular grooves of a pair of adjacent improved Arcan clamping tools 31, such that when angles between the four improved Arcan clamping tools 31 and an axis of the ball screw are adjusted, two synchronizing handles 58 orthogonally arranged ensures that the four improved Arcan clamping tools 31 are simultaneously adjusted with respect to the axis of the ball screw so as to maintain the relative positions of the four improved Arcan clamping tools 31 during angle adjustment process.

The combined guide mechanism 48 comprises a linear guide rail pair, and a curved guide rail pair configured to simultaneously guide the respective pair of improved Arcan clamping tools 31 in a stretching direction and in a shear direction of the cruciform test piece 33, respectively; when the four improved Arcan clamping tools 31 moves in relative to one another, the relative acute angle between a geometric axis of the cruciform test piece 33 to be tested and the axis of the ball screw is monotonously decreased with the loading process, that is, the motion of the improved Arcan clamping tools 31 is a combination of linear motion and a planar rotational motion surrounding a geometric midpoint of the cruciform test piece 33; therefore, the linear guide rail pair is adapted to guide tensile displacement of the cruciform test piece 33, and the curved guide rail pair is adapted to guide shear displacement of the cruciform test piece 33, and the curved guide rail pair is formed by a curved guide rail 65 and a curved guide rail platform 66 which are connected together by a curved guide rail slider 67.

The press-in test subsystem comprises the laser transmitter 35, the voice coil motor 39, an indentation force sensor 40, an indentation plane reflector 41, the laser receiver 45, an indentation force sensor nut 64, and a press head clamping unit 46, wherein the press head clamping unit 46 comprises a press head 59, a press head positioning pin 60, a moveable wedge ring 61, a stationary wedge ring 62 and a stationary stopping ring 63; wherein a visible laser of small diameter emitted by the laser transmitter 35 is received in real-time by the laser receiver 45 so as to detect an initial position of the press head 59 in a vertical position; the accuracy of the position of the press head 59 during use is maintained by a wedge-shaped pre-tightening of the press head 59; one bolt of the indentation force sensor 40 at an end thereof is rigidly connected to a moveable end of the voice coil motor 39 by means of an indentation force sensor nut 64, and the other bolt of the indentation force sensor 40 at the other end thereof is fastened to the stationary wedge ring 62 of the press head clamping unit 46 by threaded connection.

The laser transmitter 35 and the laser receiver 45 are coaxially mounted so as to form a continuous narrow optical path of a visible beam therebetween, and there is a determined fine pitch between the optical path and an upper surface of the cruciform test piece 33 subjected to polishing process so as to detect an absolute position of a tip of the press head 59 in the vertical direction; in an initial state, the absolute position of the tip of the press head 59 is higher than that of the visible beam, and after the movable end of the voice coil motor 39 performs constant velocity motion or constant acceleration motion, when the tip of the press head 59 interferes with the visible beam, an optical signal of the visible beam cannot be detected by the laser receiver 45; based on the feedback signal from the laser receiver 45, the voice coil motor 39 continues to perform a quasi-static constant velocity motion or the constant acceleration motion with a determined stroke under a control of sequence voltage so as to achieve a static press-in test or an impact press-in test of the cruciform test piece 33.

A cylindrical shank end of the press head 59 and an inner cylindrical surface of the moveable wedge ring 61 are provided with through holes having identical diameters, in a direction perpendicular to an axial direction of the press head and in a direction perpendicular to an axial direction of the moveable wedge ring 61, respectively; the press head positioning pin 60 is interference-fitted in the through holes such that a relative position between the press head 59 and the moveable wedge ring 61 is fixed; and the moveable wedge ring 61 and the stationary wedge ring 62 are positioned by conical surfaces thereof with the same inclination, and a wide end face of the moveable wedge ring 61 is in surface contact with the stationary stopping ring 63, and a narrow end face of the stationary wedge ring 62 is rigidly connected to the stationary stopping ring 63 by threaded connection such that the position of the press head 59 is precisely achieved by wedge positioning.

The biaxial fatigue test subsystem comprises a set of orthogonally arranged x, y-direction piezoelectric drives; the x-direction piezoelectric drive comprises a y-direction piezoelectric stack 3 and a x-direction fatigue flexible hinge 4; the y-direction piezoelectric drive comprises a y-direction piezoelectric stack 53 and a y-direction fatigue flexible hinge 54; and the x-direction fatigue flexible hinge 4 and the y-direction fatigue flexible hinge 54 are both of symmetrical arc transition type flexible structure;

x and y-direction piezoelectric drives are orthogonally mounted on circumferential outer edges of the improved Arcan clamping tools 31; and the x-direction piezoelectric stack 3 and the y-direction piezoelectric stack 53 are always under compression, and elastic elongation and recovery thereof provide an alternating stress having stress ratio of 0 for the cruciform test piece 33 to be tested; an enveloped structure of the x-direction fatigue flexible hinge 4 and the y-direction fatigue flexible hinge 54 comprises three sets of flexible thin walls which are arranged in parallel; in a direction perpendicular to a central axis of the x-direction piezoelectric stack 3 or the y-direction piezoelectric stack 53, the flexibility of the x-direction fatigue flexible hinge 4 or the y-direction fatigue flexible hinge 54 is gradually reduced until it can be regarded as a rigid body; when applying alternating voltages of identical frequency and equal amplitude to the x-direction piezoelectric stack 3 and the y-direction piezoelectric stack 53, the x-direction fatigue flexible lunge 4 and the y-direction fatigue flexible hinge 54 perform corresponding angular displacements along a flexible joint at their inner walls, the cruciform test piece 33 is also subject to controllable alternating loads of the identical frequency and equal amplitude.

Figure 6:
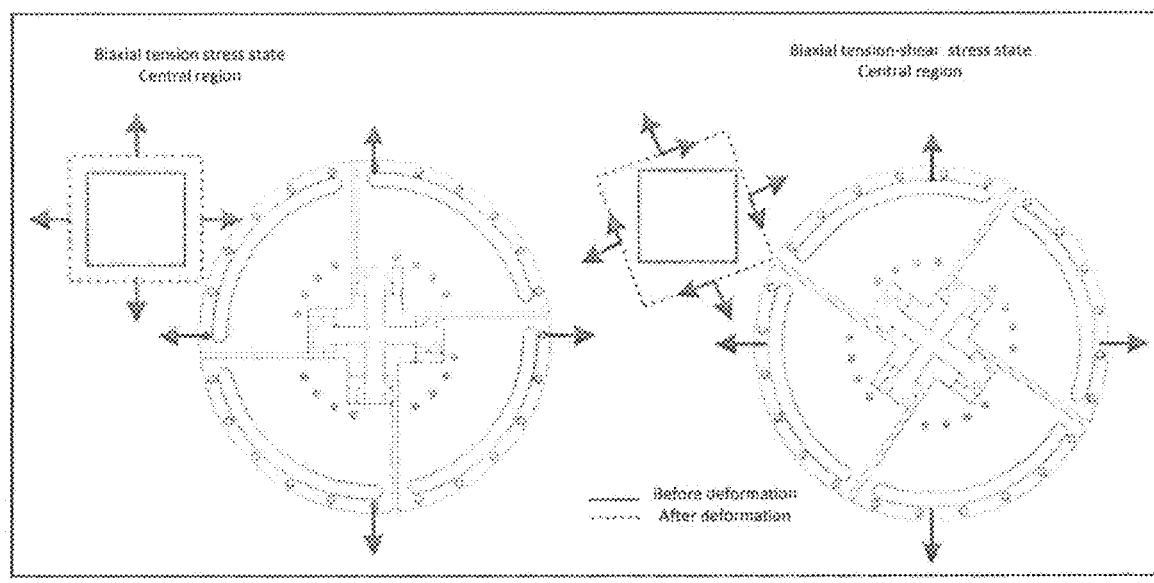
FIG. 6 is a schematic view showing the principle of biaxial tension and biaxial tension-shear composite load according to one or more embodiments.
Figure 7:
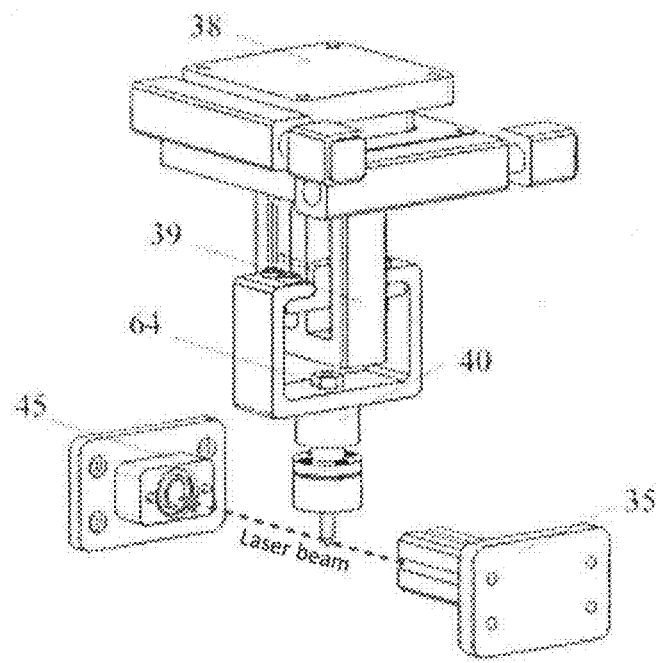
FIG. 7 is a schematic view of an indentation loading unit of one or more embodiments.
Figure 8:
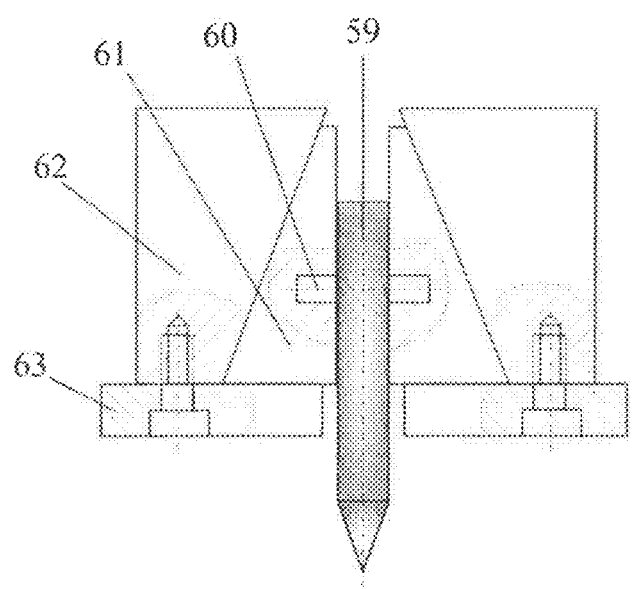
FIG. 8 is a schematic view showing a method of clamping a press head of one or more embodiments.
Figure 9:
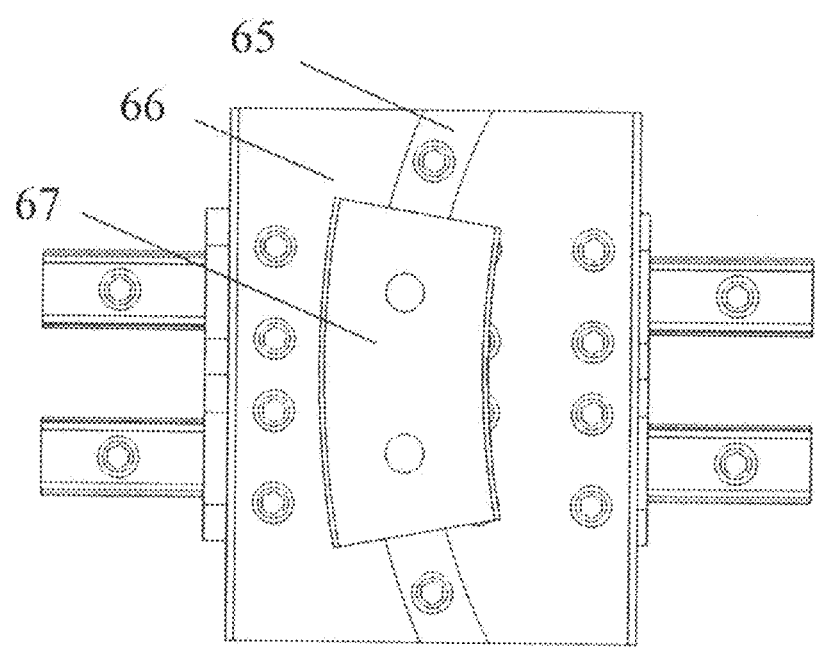
FIG. 9 is a schematic view of a combined guide mechanism of one or more embodiments.
Figure 10:
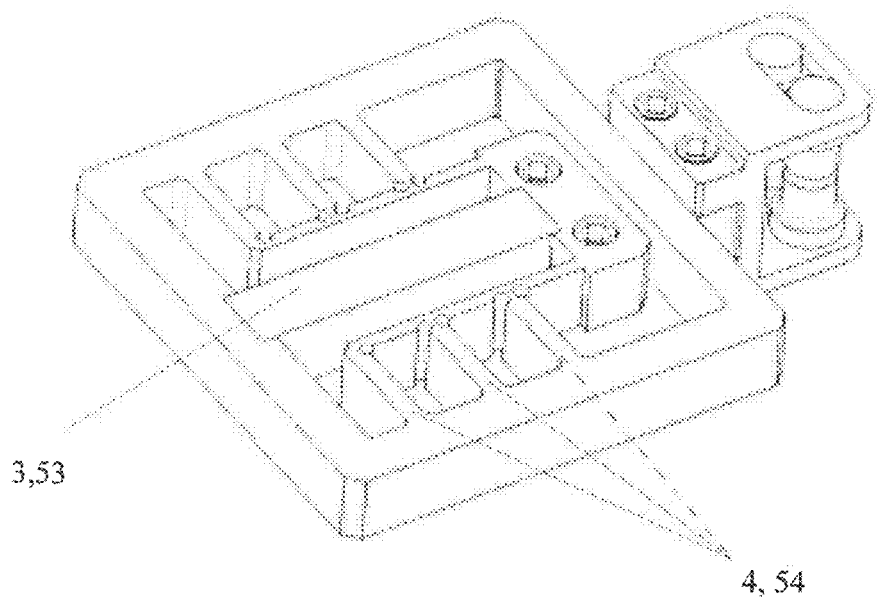
FIG. 10 is a schematic view of a piezoelectrically driven fatigue loading unit of one or more embodiments.
Figure 11:
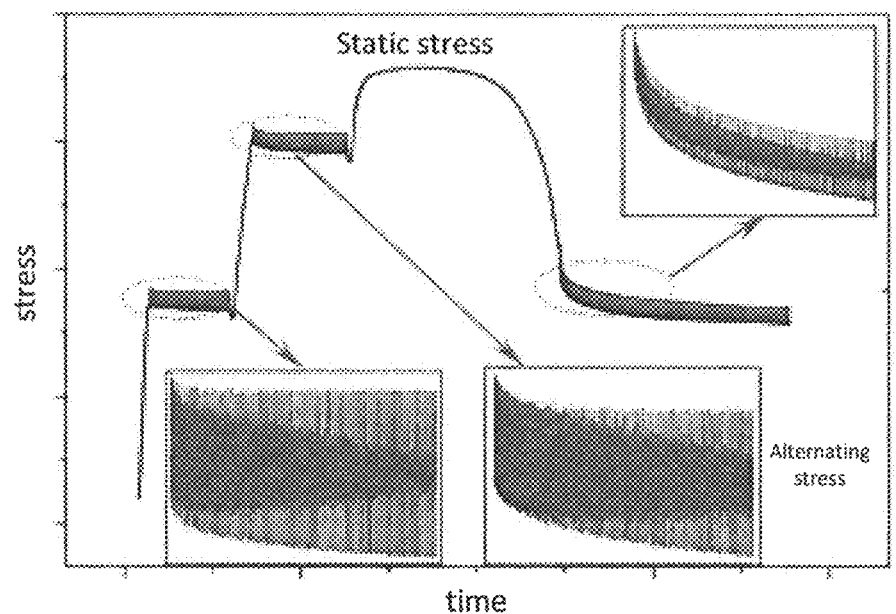
FIG. 11 is a schematic diagram showing a stress-time curve of a static and dynamic coupling test of one or more embodiments.
Figure 12:
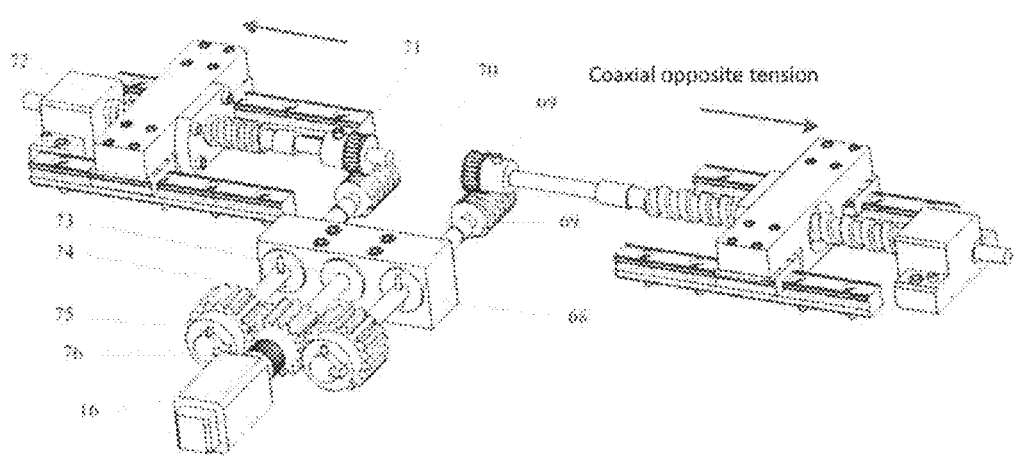
FIG. 12 is a schematic view of a biaxial pre-tension loading subsystem of one or more embodiments.

As shown in FIG. 6, the biaxial pre-tension loading subsystem comprises a y-direction spur gear I 25, a y-direction spur gear II 28, a x-direction screw nut 6, a x-direction ball screw 7, a y-direction ball screw 14, a x-direction linear guide rail 8, a x-direction guide rail slider 9, a x-direction spur gear I 15, a x-direction spur gear II 18, a x-direction servo motor 16, a y-direction servo motor 27, a x-direction drive spur gear 17, a y-direction drive spur gear 26, as y-direction linear guide rail 20, a y-direction guide rail slider 21, a y-direction screw nut 22, a cantilever support seat 23, a wormwheel positioning pin 69, a worm 70, a wormwheel 71, an outer positioning bearing 73, a worm shaft 74, a positioning pin 75, and a flexible coupling 76; through a swallowtail wedge structure, a x-direction guide rail slider 9 floats above a x-direction linear guide rail 8 rigidly connected to the base 10; similarly, a the y-direction guide rail slider 21 also floats above a y-direction linear guide rail 20 through a swallowtail wedge structure; a y-direction screw support seat 13 and the y-direction linear guide rail 20 are rigidly mounted on a y-direction fixing base 19 by threaded connection. In addition, a y-direction screw nut 22 is sleeved on a flange of a x-direction ball screw 7 and rigidly mounted on the x-direction guide rail slider 9 together with a x-direction screw nut bracket 24 by threaded connection. An output shaft of a y-direction servo motor 27 and a gear shaft of a y-direction drive spur gear 26 are respectively embedded in a through hole of a flexible coupling 76 so as to transmit an output torque motion of the y-direction servo motor 27. A flat key 49 is embedded in a key groove of a worm shaft 74, and positioning faces on both sides of the flat key 49 are in surface contact with spur gear, such as a x-direction spur gear I 15 and a x-direction spur gear II 18; and a positioning pin 75 is interference-fitted in an inner hole formed at an axial end of the worm shaft 74 and perpendicular to an axial direction of the worm shaft 74 so as to limit axial movements of the spur gears comprising the x-direction spur gear I 15, the x-direction spur gear II 18, the y-direction spur gear I 25 and the y-direction spur gear II 28. A wormwheel 71 is sleeved on an axial end of a x-direction ball screw 7 or a y-direction ball screw 14 through its inner bore and a wormwheel positioning pin 69 so as to limit rotation freedom thereof; and a bearing inner bore of an outer positioning bearing 73 is interference-fitted on a gear shaft of a x-direction drive spur gear 17 or the y-direction drive spur gear 26, and a bearing outer ring of the outer positioning bearing 73 is interference-fitted within a hearing housing hole of a worm shaft base 68, and a retaining ring of the outer positioning bearing 73 is in surface contact with an retaining surface of an outer wall of the worm shaft base 68 so as to limit the axial movement of the gear shaft of the x-direction drive spur gear 17 or the y-direction drive spur gear 26.

A pair of x-direction ball screws 7 have axes that are coaxial to each other and that are perpendicular to geometric axes of the x-direction spur gear I 15, the x-direction spur gear II 18 and the x-direction drive spur gear 17, and both have a helix shape that is right-handed; and the single-stage worm and worm wheel reduction mechanism consisting of the worm 70 and the wormwheel 71 has a gear ratio of 40;

The biaxial pre-tension loading subsystem provides a biaxial controllable pre-stress or pre-strain for the cruciform test piece 33, that's to say, it can conduct a fatigue test based on various biaxial tension-shear pre-stress states, and the biaxial pre-tension loading subsystem can achieve coaxial and opposite stretching motions of identical speed in two orthogonal directions, and given the loading direction is in x direction, the biaxial pre-tension loading subsystem is only driven by the x-direction servo motor 16, which provides torque and rotation output thereto; accordingly, the x-direction spur gear I 15 and the x-direction spur gear II 18 which are meshed with the x-direction drive spur gear 17, output synchronous rotation motions of same speed and of same direction, respectively; and the wormwheel 70 and the worm 71, mounted coaxially and opposite to each other, have opposite directions of rotation, namely left-handed and right-handed, respectively; a set of x-direction ball screws 7 are all right-handed and can output synchronous motions of equal-speed and of opposite-rotating directions, thereby driving a set of x-direction screw nuts 6 to output coaxial and opposite motions, thereby ensuring that the geometric center of the cruciform test piece 33 is in the central region of the test system and the imaging field without directional movement with the loading process, in any plane stress state.

The signal detection subsystem comprises a x-direction force sensor 30, a y-direction force sensor II, a horizontal laser displacement sensor I 32, a horizontal laser displacement sensor II 55, a plane reflector 34, an indentation laser displacement sensor 37, an indentation force sensor 40, an indentation plane reflector 41, a contact displacement sensor I 42, a contact displacement sensor II 43, a displacement sensor moving rod support 56 and a displacement sensor body support 57, wherein a pair of horizontal laser displacement sensors I, II 32, 55 are mounted orthogonal to a pair of contact displacement sensor I, II 42, 43, respectively; and geometric axes of the x-direction force sensor 30 and the y-direction force sensor 11 forms acute angles with symmetry lines between incident light and reflected light of the horizontal laser displacement sensors I, II 32, 55 and also forms acute angles with geometric axes of the contact displacement sensors I, II 42, 43.

The macroscopic and microscopic deformations of the cruciform test piece 33 under biaxial tension-shear plane stress are respectively detected by a set of contact displacement sensors I, II 42, 43 and a set of horizontal laser displacement sensors I, II 32, 55; when the cruciform test piece is in the elastic deformation stage, the set of horizontal laser displacement sensors I, II 32, 55 with small range and high test resolution are used for the detection of micro elastic deformation (i.e. microscopic deformation). When the test piece is in the stage of hardening or necking deformation, the contact displacement sensors I, II 42, 43 are used to detect the relative deformation (i.e. macroscopic deformation) between a set of improved Arcan clamping tools 31.

The support and adjustment subsystem comprises a gantry column 1, the two-degree-of-freedom electric moving platform 2 for the laser receiver, the guide mechanism support block 5, a base 10, the two-degree-of-freedom electric moving platform 36 for the laser transmitter and the two-degree-of-freedom electric moving platform 38 for the voice coil motor, wherein the base 10 is used to support the biaxial pre-tension loading subsystem and the biaxial fatigue test subsystem; and the two-degree-of-freedom electric moving platform 2 for the laser receiver, the guide mechanism support block 5, the two-degree-of-freedom electric moving platform 36 for the laser transmitter and the two-degree-of-freedom electric moving platform 38 for the voice coil motor rigidly connected to the gantry column 1 are configured to adjust the positions of the laser receiver 45, the laser transmitter 35 and the voice coil motor 39 in the press-in test subsystem in real time, respectively.

In a method for in-situ testing of mechanical properties of materials in static and dynamic load spectra of one or more embodiments, for a stress-strain decoupling method for an Arcan biaxial clamping subsystem and a biaxial pre-tension loading subsystem, a central region and a gauge portion of a cruciform test piece 33 are simplified to a unit body with uniform deformation; when calculating an actual stress and strain caused by each component of loads suffered by the cruciform test piece 33 under a tension-shear plane stress state and a biaxial tension plane stress state, by means of principle of superposition, combined effects of a tension-shear load and a biaxial tension load on the stress and strain of the cruciform test piece 33 are decoupled into a vector coupling superposition of a stress-strain constitutive relation under each single load; taking an elastic elongation, a plastic flow and a cross-section change of a material, in a target load acting direction, caused by other class of loads into consideration, a deformation behavior of the unit body of a simplified model in the target load acting direction is quantitatively described so as to obtain a relationship between the stress and strain under the target load and a known coupling load and a displacement. The decoupling method comprising: for a tension-shear composite stress state, in order to calculate an actual tensile strain and an actual shear strain of the cruciform test piece 33 under an external load, which forms an acute angle to an axial direction of the cruciform test piece, a step of establishing simplified regular hexahedron model, wherein the simplified regular hexahedron model characterizes the gauge portion of the cruciform test piece 33, wherein an offset angle formed between an initial geometric axis of the regular hexahedron and a stretching direction is a known parameter, and a length, a width and a height of the regular hexahedron respectively correspond to a length, a width and a thickness of the gauge portion of the cruciform test piece; a step of quantitatively calculating an angle between a geometric axis of a rhombohedron and the initial geometric axis of the regular hexahedron, wherein under the external load coaxial with the stretching direction, the regular hexahedron model is changed to the rhombohedron; and a step of verifying, wherein an actual tensile stress and strain and a shear stress and strain of a cruciform test piece are directly collected and calculated by force sensors and displacement sensors, respectively, and then a respective tensile stress-strain curve and a respective shear stress-strain curve are decoupled, and then the decoupling method can be verified by three-dimensional strain analysis of a digital speckle measurement technique.

For a biaxial tension mode, a central region of the cruciform test piece 33 is stretched evenly under an action of plane stress, whereas a width of a parallel beam section gradually decreases in a load acting direction, a quantitative relationship between a deformation distribution and a load effect of the cruciform test piece is established by simulation analysis and image test method.

Referring to FIG. 1 to FIG. 14, the components and specific models involved in one or more embodiments are as follows;

the voice coil motor 39 is of BET-TIME-S0006 type, which has a maximum output load of 6N, a maximum loading stroke of 10 mm, a driving voltage of 13.3V and a Back Electromotive Force (BEMF) of 4.5V, respectively;

the x-direction piezoelectric stack 3 and y-direction piezoelectric stack 53 are both of PANT-PTJ1501414401 model, which has a main body size of 14 mm×14 mm×40 mm, a maximum nominal displacement of 40 μm, a maximum thrust of 7200N, a stiffness of 180 N/μm, and a resonant frequency of 37 kHz;

the x and y-direction force sensors 30 and 11 are both capable of being stretched and pressed, and of UNIPULSE-UNCLB-500N model, which has a measuring stroke of 500N, a linear precision of 0.5% and a axial deformation of 0.01 mm under the rated load;

the indentation force sensor 40 is of a Maxwell-FB10 model, which has a measuring stroke of 30N, a linear accuracy of 0.5% and an output sensitivity of 1 mV/V;

the indentation laser displacement sensor 37 is of KEYENCE-LK-G10 model, which has an optical reference distance of 10 mm, a measurement range of 1 mm, and a test resolution of 10 nm;

the horizontal laser displacement sensor I 32 and the horizontal laser displacement sensor II 55 are both of HL-C203BE-MK model, which has an optical reference distance of 30 mm, a linear accuracy of 0.03%, a measurement range of 1 mm and a test resolution of 200 nm.

the contact displacement sensor I 42 and the contact displacement sensor II 43 are both of SOWAY-SDV-H20 model, which has a stroke of 8 mm and a test resolution of 1 μm;

the x-direction servo motor 16 and the y-direction servo motor 27 are both of YASKAWA-SGMAV model, which has a rated power of 150V, a rated torque of 0.477 N·M, a rated speed of 3000 r/min and a maximum speed of 6000 r/min;

the curved clamping, positioning portions of the gantry column 1, the base 10, the force sensor connection component 44, the synchronizing handle 58 and the improved Arcan clamping tool 31 are all machined by multi-axis CNC milling process;

the rotary parts of the moveable wedge ring 61, the stationary wedge ring 62, the stationary stopping ring 63 and the worm shaft 74 and the like are machined by CNC turning process;

the annular grooves of the x-direction fatigue flexible hinge 4, the y-direction fatigue flexible hinge 54, the y-direction fixing base 19 and the improved Arcan clamping tool 31 are all machined by a slow-feeding wire cutting process;

the mounting plane between the gantry column 1 and each two-degree-of-freedom electric moving platform, and the mounting plane between the base 10 and each supporting member are all machined by a grinding flattening process; and the x-direction fatigue flexible hinge 4 and the y-direction fatigue flexible hinge 54 are made of 65 Mn steel, this type of steel meets the preparation requirements of GB/T 1222-2007, and its symmetrical cycle fatigue limit is greater than 400 MPa.

For the servo control of the x, y-direction. servo motor 16, 27, the digital signal of the photoelectric encoder fixed to the servo motor rotor or the analog signal output by the x, y-direction force sensor 30, 11 is used as the feedback signal so as to construct a closed-loop control system for in-situ mechanical testing. The closed-loop control system mainly includes an industrial computer, a DC stabilized power supply, a motor drive controller, a data acquisition card, a conditioning amplifier circuit, and a host computer software. During the test, the load rate or displacement rate is given as a control parameter by the host computer software. The command is triggered in the form of a pulse by a multi-axis motion control card and acts on the winding of the servo motor, such that the x, y-direction servo motor 16, 27 outputs the corresponding rotary motion. On this basis, the load/sensor detection signal and the digital signal of the photoelectric encoder are read by the 16-bit data acquisition card at a high sampling frequency. In each sampling period, the load/displacement analog signal is compared with the load/displacement signal preset by the host computer software and calculated in real time, and the calculation error is sent to the host computer for processing until the amount of variation between the sampled value of the detection signal and the preset signal is within the allowable range. In addition, all high-power circuits are separated from the low-power devices during the test to reduce electromagnetic interference and ensure safe use.

In the transmission unit of the biaxial pre-tension loading subsystem, the rated torque and angular velocity of the x, y-direction servo motor 16, 27 are $T_m$ and $\omega_m$, respectively. The transmission efficiency of the flexible coupling 76 is $\eta_1$. The input torque and the output torque of the set of wormwheel and the worm are $T_{w1}$ and $T_{w2}$, respectively. Since the servo motor 16 or 27 are connected to the set of wormwheel and the worm by means of the flexible coupling 76, the input torque of the set of wormwheel and the worm $T_{w1}=T_m\eta_1$. Since the set of wormwheel and the worm is adapted to drive the set of ball screw and nut, $T_{w2}$ is also the input torque of the set of right-handed ball screw and nut. The output load F of the loading subsystem is closely related to the helical pitch or lead $P_b$ and the transmission efficiency $\eta_2$ it the ball screw, and can be expressed as:

$$F=2\pi\eta_2 T_{w2}/P_b \qquad (1)$$

Where $\eta_2$ depends on the lead angle $\alpha$ and the friction angle $\beta$ of the ball screw, and is expressed as;

$$\eta_2=\tan\alpha/\tan(\alpha+\beta) \qquad (2)$$

the input torque $T_{w2}$ of the set of the ball screw and the nut depends on the torque $T_{w1}(T_{w1}=T_m\eta_1)$ of the set of wormwheel and worm, the transmission efficiency $\eta_w$, and the reduction ratio $i_w$. It can be seen that $T_{w2}$ can be expressed as:

$$T_{w2}=T_m\eta_1\eta_w i_w \qquad (3)$$

The cruciform test piece 33 to be tested is firstly machined to be a symmetrical structure by wire cutting process. In order to avoid stress concentration, a circular arc transition zone with a radius of 1.5 mm is prefabricated at the junction of the central region and the cruciform arm regions. The width of the cruciform arm region is the same as the minimum distance between a pair of curved raised structures of the improved Arcan clamping tool 31. Before the testing, the cruciform test piece 33 is subjected to polishing treatment at one side thereof by mechanical polishing, electro-chemical polishing, etc. If the test piece is a single crystal or a polycrystalline material, the metallographic structure can also be prepared by a specific etchant. In addition, in order to observe the fatigue crack initiation and fatigue crack propagation, the press-in test can be used to prepare indentation defects of different depths in the central region and the cruciform arm regions of the cruciform test piece 33. During the specific test process, firstly, according to the needs of the test mode, a pair of positioning pin structures of the synchronizing handle 58 is respectively embedded in annular grooves of a pair of adjacent improved Arcan clamping tools 31, and then four improved Arcan clamping tools 31 are rotated at the same time. The relative angle between a specific linear edge of each improved Arcan clamping tools 31 and the axis of the ball screw is measured in real time using a high resolution digital angle measuring instrument. After the angle preset is completed, the cruciform test piece 33 is installed in a space surrounded by the curved raised structures of the four improved Arcan clamping tools 31, and the clamp portions of the cruciform test piece 33 are fastened by a press plate. Next, the pulse signals of the same amplitude and sequence are applied to the windings of the x-direction servo motor 16 and the y-direction servo motor 27, such that the x-direction servo motor 16 and the y-direction servo motor 27 are synchronously rotated at a constant speed, and accordingly the four improved Arcan clamping tools 31 are driven to synchronously move far away from each other at a constant speed. Correspondingly, the cruciform test piece 33 is subjected to plane tension-shear stresses of identical magnitude. Through the real-time observation of the stress-strain curve in the host computer software, the loading process, i.e. the stress or strain state of the cruciform test piece 33, can be controlled in real time. The elastic deformation stage, the yield deformation stage, the hardening deformation stage, the highest stress stage and the necking stage can be selected as a representation of stress or strain states during the test. On this basis, based on the known plane stress state, the test frequency and amplitude in different orthogonal directions can be set in the host computer software. At the same time, a sinusoidal signal or pulse signal with a specific frequency and amplitude is applied to the x-direction piezoelectric stack 3 or y-direction piezoelectric stack 53 as a driving power source by a multi-channel piezoelectric controller. The x-direction piezoelectric stack 3 and the y-direction piezoelectric stack 53 are always under pressure, and the maximum loading frequency is 100 Hz. At this time, the cruciform test piece 33 is subjected to the biaxial static and dynamic load at the same time, and the fatigue test based on the complex plane stress state can be carried out. At the same time, the horizontal laser displacement sensor I 32 and the horizontal laser displacement sensor II 55 are used to detect the elastic deformation and alternating deformation of the cruciform test piece 33 in two orthogonal directions, respectively. The contact displacement sensor I 42 and the contact displacement sensor II 43 are used to detect the plastic deformation cruciform test piece 33 in two orthogonal directions. Similarly, the x-direction force sensor 30 and the y-direction force sensor 11 are used to detect the composite load experienced by the cruciform test piece 33. Combined with the corresponding tension-shear stress-strain constitutive decoupling method, the tensile load, the shear load and the deformation of cruciform test piece 33 in each direction can be quantitatively analyzed.

In addition, based on the same method of constructing complex plane stress states, the voice coil motor 39 can also be used to perform static press-in tests or impact press-in tests based on complex planar stress states. The voice coil motor 39 used in one or more embodiments has excellent characteristics such as simple structure, small inertia load, high speed, high acceleration, fast response speed, and high-precision driving. During use, by supplying power to the coil of the voice coil motor 39, the coil drives the actuator to synchronously move according to the Lorentz force principle. When the position of a tip of the press head 59 is higher than the visible beam between the laser transmitter 35 and the laser receiver 45, the voice coil motor 39 generates a constant speed motion or a lateral acceleration motion according to the test mode. After the optical path is broken, the displacement of the tip of the press head 59 is in conformity with a displacement stroke preset by the host computer software to achieve a static press-in test or an impact press-in test. The indentation depth and pressing load during the press-in test are respectively detected in real time by the indentation laser displacement sensor 37 and the indentation force sensor 40. In the fatigue test, in order to achieve in-situ monitoring of the deformation process of the prepared defect area of the cruciform test piece 33, after completing a determined number of cycles (such as $10^3$), the power supply to the x, y-direction servo motors 16, 27 and x, y-direction piezoelectric stacks 3, 53 is cut of, which is beneficial to the release of accumulated charge in the piezoelectric stack on one hand, and also facilitates the three-dimensional strain optical measurement system and the optical microscopy imaging system with continuous zoom function to perform high-resolution observations to the extended behavior of fatigue crack in the defect area on the other hand.

Figure 13A:
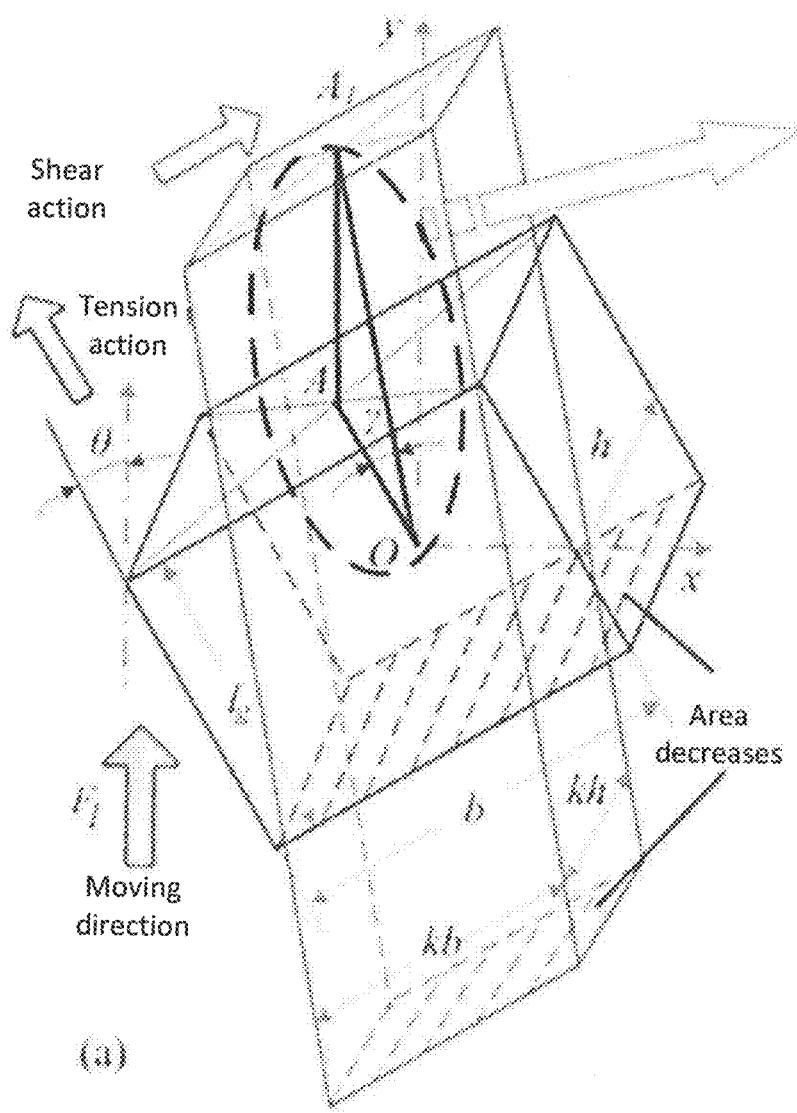
FIG. 13(a) is a decoupling model of load and displacement in a tension-shear composite load mode.
Figure 13B:
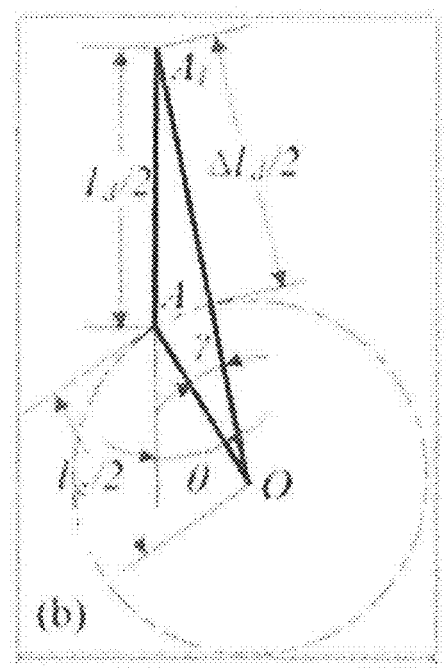
FIG. 13(b) is an obtuse triangle for calculating strain.
Figure 13C:
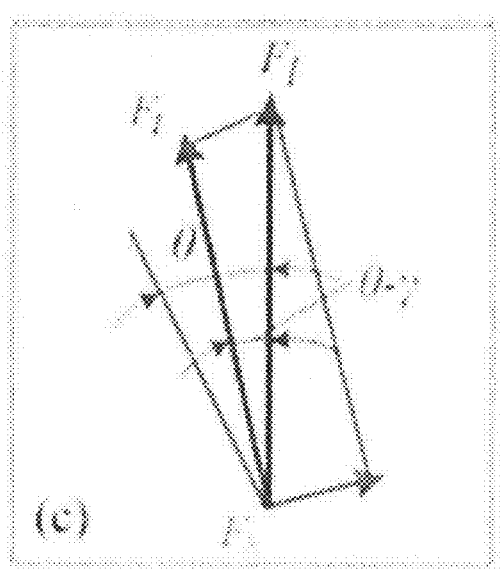
FIG. 13(c) is a method of decoupling the load.

In addition, in order to calculate the actual tensile strain and shear strain of the cruciform test piece 33 when the external load is at an acute angle to the axial direction of the test piece, FIG. 13 establishes a corresponding calculation model, which simplifies a gauge portion of the cruciform test piece 33 into a regular hexahedron which is isotropic. An initial geometric axis (a straight line segment OA in the figure) of the regular hexahedron forms an offset angle θ with respect to a stretching direction. A length $l_g$, a width b, a height h of the regular hexahedron correspond to a length, a width and a thickness of the gauge length of the test piece, respectively. Under the action of the external load $F_l$ coaxial with the stretching direction, the regular hexahedron model is transformed into a rhombohedron whose changed geometric axis (a straight line segment $OA_1$ in the figure) and the initial geometric axis form an angle of γ, whereas the angle between a shearing face (i.e, a plane orthogonal to the straight line segment OA) and the stretching direction is always the complementary angle of θ (i.e. π/2−θ), which does not change with $F_l$. It can be seen that the actual tensile and shear stress and strain of the cruciform test piece 33 is not in a simple sine or cosine relationship with the stress and strain acquired and calculated directly by the force sensor and the displacement sensor.

As shown in part (a) of FIG. 13, a point A and a point $A_1$ represent the center points of the top cross sections of the regular hexahedron and the rhombohedron, respectively. The gauge length $l_g$ of the regular hexahedron model can be considered as a multiple of a distance (i.e. the length of the OA line segment in the figure) between the geometric center (the point O) and the center point (the point A) of the top cross section of the regular hexahedron. A straight line segment $AA_1$ always parallel to the stretching direction, and does not change with the offset angle θ. The actual elongation of the cruciform test piece 33 is $\Delta l_d/2$ corresponds a multiple of the difference between the length of the $OA_1$ line segment and the length of the OA line segment in the figure. Therefore, the relationship between the calculated strain value of the test piece and the actual strain value can be established by the side length relationship of the obtuse triangle $OAA_1$ shown in part (b) of FIG. 13, wherein the length $l_d/2$ of the straight line segment of the $AA_1$ is a single-end elongation in the stretching direction read by the displacement sensor. By means of the cosine theorem, the relationship between $\Delta l_d$, $l_d$ and $l_g$ can be expressed as:

$$\Delta l_d = \sqrt{l_g^2 + l_d^2 + 2l_d l_g \cos\theta} - l_g \quad (4)$$

Accordingly, the actual strain ε of the cruciform test piece 33 can be expressed by the formula (5), and it is known that ε increases with the increase of $l_d$.

$$\varepsilon = \ln(\Delta l_d/l_g + 1) = \ln(\sqrt{l_g^2 + l_d^2 + 2l_d l_g \cos\theta}/l_g) \quad (5)$$

At the same time, in the shear plane the top cross section of the rhombohedron), the shear angle γ formed by the shearing action can be regarded as the shear strain of the cruciform test piece 33, and can be determined by the angle between the straight line $OA_1$ and the straight line OA, such as shown in part (b) FIG. 13, γ can be expressed as:

$$\gamma = \arccos[(l_g + l_d \cos\theta)/\sqrt{l_g^2 + l_d^2 + 2l_g l_d \cos\theta}] \quad (6)$$

Therefore, when the offset angle θ is determined, γ also increases with the increase of $l_d$. Specifically, according to the size of the test piece shown in part (b) of FIG. 13, when the initial offset angle θ is 45°, and the elongation (i.e., $l_d$) of the test piece read by the displacement sensor is 0.05 mm, the calculated value of γ is 0.123 rad, and when $I_d$ is increased to 0.1 mm, the calculated value of γ is 0.216 rad.

Further, according to the above angular relationship, the actual tensile force $F_t$ and the shearing force $F_s$ of the cruciform test piece 33 are extracted as shown in part (c) of FIG. 13, because $F_t$ and $F_s$, are respectively applied in an elongation direction and a shear plane of the regular hexahedron, $F_t$ and $F_s$ can be expressed as the cosine component and sine component of the external load $F_l$, respectively. It is assumed that the volume of the gauge portion of the test piece is constant and the test piece varies uniformly in each direction in a space during the deformation process. The top cross-sectional area of the hexahedron after the test piece is elongated can be expressed as the product of b, h and $k^2$, where k is the size reduction factor, and determined by $\Delta l_d$. The calculation method of k can be expressed as:

$$k^2 = l_g/(l_g + \Delta l_d) \quad (7)$$

Further, based on the formula (7), the relationship between the actual tensile stress $\sigma_1$, the shear stress $\tau_s$ and the external load $F_l$ of the test piece can be expressed by equations (8) and (9), respectively:

$$\sigma_1 = F_l \cos(\theta-\gamma)/(k^2 bh) \qquad (8)$$

$$\tau_s = F_l \sin(\theta-\gamma)/(k^2 bh) \qquad (9)$$

It can be seen that the cosine and sinusoidal relations of $\sigma_1 \cdot \tau_s$ and $F_l$ are based on the angular difference between the initial offset angle $\theta$ and the gradually varying shear angle $\gamma$, and not based on $\theta$ itself. Similarly, when the offset angle $\theta$ is determined, $\sigma_1$ and $\tau_s$ also increase with the increase of $l_d$.

Figure 14:
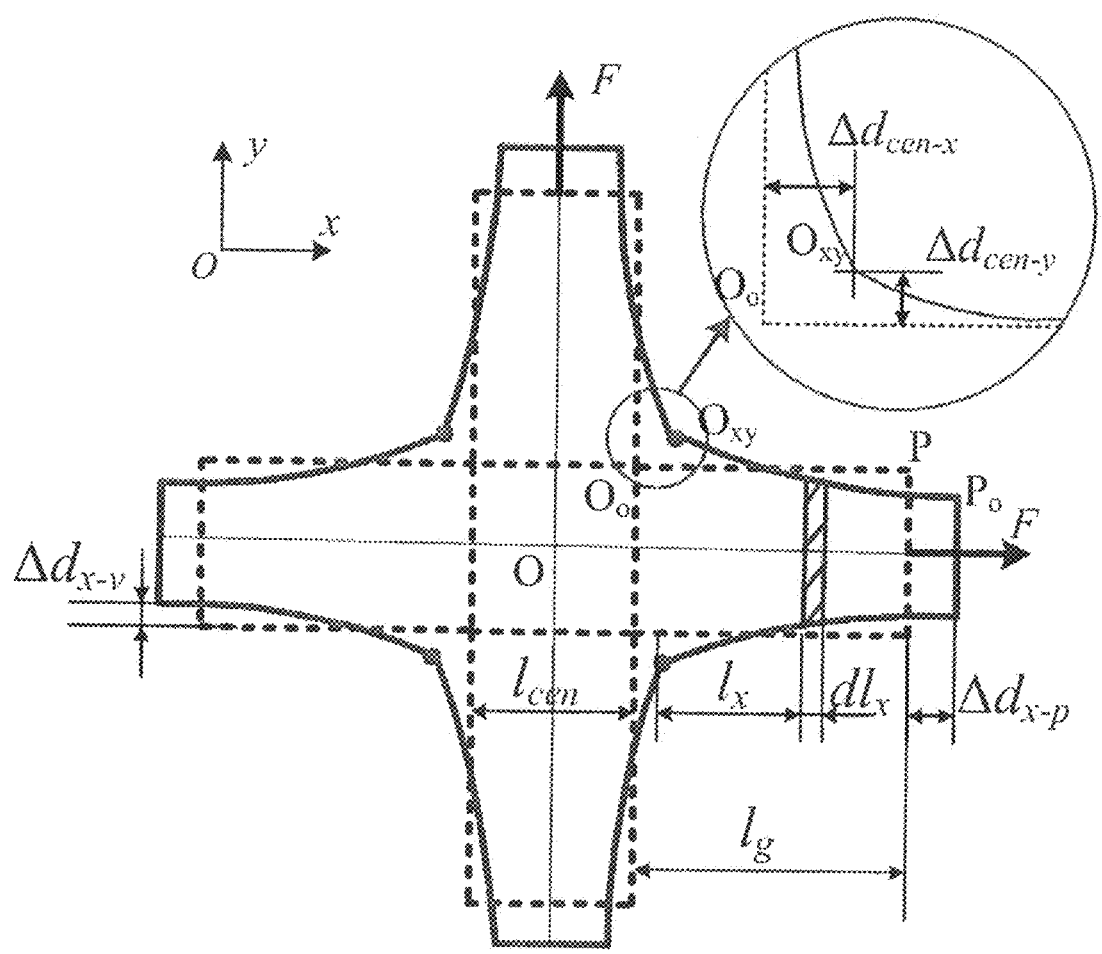
FIG. 14 shows the theoretical model of stress and strain calculation for a cruciform test piece under biaxial tension loading.

Further, as shown in FIG. 14, the theoretical model of stress and strain calculation of cruciform test piece 33 under biaxial tension load is shown. Under the biaxial tension load, the deformation characteristics of the boundary of the gauge portion of the cruciform test piece 33 can be approximately fitted as an exponential function, and $l_{cen}$ and $l_g$ are the initial length of the central region and the initial length of the gauge portion of the test piece, respectively. Under the action of isotropic tensile load F, the point $O_o$, which is acted as a joint point between a pair of gauge segments perpendicular to each other, produces an directional movement to the point $O_{xy}$, and the corresponding movement displacements in the x and y directions are respectively $\Delta d_{cen-x}$ and $\Delta d_{cen-y}$, and at the same time, the point P moves to the point $P_o$, and the corresponding additional displacements in the length and width directions of the test piece are $\Delta d_{x-p}$ and $\Delta d_{x-v}$, respectively. The $l_x$ is defined as an independent variable in the stretching direction, and $dl_x$ is a small deformation unit. The actual strain of the central region and the actual strain of the gauge portion of the cruciform test piece 33 in the x direction can be quantitatively expressed by the formulas (10) and (11), respectively. In addition, considering the uniformity of deformation in all directions, the mathematical relationship between $\Delta d_{cen-x}$ and $\Delta d_{x-p}$ can be expressed by equation (12), that is, the total elastic strain of the test piece in the stretching direction is as shown in formula (13), where $\varepsilon_t$ and $\varepsilon$ represent the actual strain and engineering strain of the cruciform test piece 33, respectively.

$$\varepsilon_{c-x} = \int_{\frac{l_{cen}}{2}}^{\frac{l_{cen}}{2}+\Delta d_{cen-x}} \frac{dl_x}{l_x} \qquad (10)$$

$$\varepsilon_{g-x} = \int_{l_g}^{l_g+\Delta d_{x-p}} \frac{dl_x}{l_x} \qquad (11)$$

$$\frac{\Delta d_{x-p}}{l_g + \frac{l_{cen}}{2}} = \frac{\Delta d_{cen-x}}{\frac{l_{cen}}{2}} \qquad (12)$$

$$\varepsilon_a = \int_{l_g+\frac{l_{cen}}{2}}^{l_g+\frac{l_{cen}}{2}+\Delta d_{x-p}} \frac{dl_x}{l_x} = \ln\left(\frac{\Delta d_{x-p}}{l_g + \frac{l_{cen}}{2}} + 1\right) = \ln(\varepsilon+1) \qquad (13)$$

At the same time, considering the invariance of the volume of the cruciform test piece 33 during the plastic deformation process, the cross-sectional area $S_{after}$ of the test piece after deformation can be regarded as the sum of the area $S_x$ of the gauge portion Sx and the area $S_c$ of the central region, which can calculated indirectly by the total area $S_{before}$ before deformation of the cruciform test piece 33 and the width of the test piece ($t_{before}$ and $t_{after}$) of the cruciform test piece 33. At the same time, considering that the ratio of the thickness of the test piece to its width and the ratio of the thickness of the test piece to its length is small, the variation of the thickness of the test piece is approximately simplified to a linear change of the coefficient C. Therefore, based on the above theory; the mathematical descriptions among $S_{after}$, $S_{before}$, $S_x$, $S_c$, C, $t_{before}$ and $t_{after}$ are as shown in equations (14-17).

$$S_{before} t_{before} = S_{after} t_{after} \approx S_{after} C t_{before} \qquad (14)$$

$$S_{before} = l_{cen}^2 + 4 l_{cen} l_g \qquad (15)$$

$$S_{after} = S_c + S_x \qquad (16)$$

$$S_c = (l_{cen} + 2\Delta d_{cen-x})^2 \qquad (17)$$

Based on the above approximately exponential fitting method for the gauge portion of the test piece, the area $S_x$ of the gauge portion can be calculated quantitatively by a definite integration in which $l_g - \Delta d_{cen-x} + \Delta d_{x-p}$ is defined as the integral upper limit and 0 is defined as the integral lower limit. The formula is as shown in (18), where A is a constant term in the range between 0 and 1. Since $l_g$, $\Delta d_{cen-x}$, $\Delta d_{x-p}$, $l_{cen}$ and $t_{before}$ are known quantities in the above formula, and theoretically, $t_{after}$ can be detected in real time, therefore, the coefficient C can be determined. Therefore, the constant term A can also be calculated quantitatively. Meanwhile, the quantitative relationship between the actual stress $\sigma_1$ of the cruciform test piece 33 and the engineering stress $\sigma$ can be determined by the formula (19).

$$S_x = 8\sigma \int_0^{l_g - \Delta d_{cen-x} + \Delta d_{x-p}} A^{(l_x - \Delta d_{cen-x})} dl_x \qquad (18)$$

$$= \frac{8\sigma\left(A^{l_g - 2\Delta d_{cen-x} + \Delta d_{x-p}} - A^{-\Delta d_{cen-x}}\right)}{\ln A}, 0 < A < 1$$

$$\sigma_t = \frac{F}{2\sigma A^{\Delta d_{x-p} - \Delta d_{cen-x}} t_{after}} \qquad (19)$$

$$= \frac{(l_{cen} + 2\Delta d_{cen-x})^2 + \frac{8\sigma\left(A^{l_g - 2\Delta d_{cen-x} + \Delta d_{x-p}} - A^{-\Delta d_{cen-x}}\right)}{\ln A}}{2\sigma A^{\Delta d_{x-p} - \Delta d_{cen-x}} (l_{cen} + 4 l_g)}$$

The above description is only one or more embodiments, and is not intended to limit the present invention, and various modifications and changes can be made to the present invention. Any modifications, equivalence, improvements, etc. made to one or more embodiments are intended to be included in the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A system for in-situ testing of mechanical properties of materials in static and dynamic load spectra, comprising:
    an Arcan biaxial clamping subsystem, a press-in test subsystem, a biaxial fatigue test subsystem, a biaxial pre-tension loading, subsystem, a signal detection subsystem, and a support and adjustment subsystem,
    wherein a combined guide mechanism in the Arcan biaxial clamping subsystem is rigidly connected to a guide mechanism support block, an x-direction force sensor base and a y-direction force sensor base in the support and adjustment subsystem by threaded connections, respectively;

a laser transmitter, a voice coil motor and a laser receiver in the press-in test subsystem are rigidly connected to a two-degree-of-freedom electric moving platform for the laser transmitter, a two-degree-of-freedom electric moving platform for the voice coil motor and a two-degree-of-freedom electric moving platform for the laser receiver in the support and adjustment subsystem by threaded connections, respectively, wherein the two-degree-of-freedom electric moving platform for the voice coil motor is mounted onto a beam of a gantry column by a platform fastening bolt;

an x-direction fatigue flexible hinge and a y-direction fatigue flexible hinge in the biaxial fatigue test subsystem are rigidly connected to the guide mechanism support block in the support and adjustment subsystem and one of force sensor connection components in the signal detection subsystem by means of fatigue fastening bolts, respectively;

a y-direction fixing base, a cantilever support seat, a worm shaft base and an x-direction screw support seat in the biaxial pre-tension loading subsystem are rigidly connected to a base in the support and adjustment subsystem by threaded connections, respectively;

a horizontal laser displacement sensor I and a horizontal laser displacement sensor II in the signal detection subsystem are rigidly connected to an improved Arcan clamping tool in the Arcan biaxial clamping subsystem;

a contact displacement sensor I and a contact displacement sensor II in the signal detection subsystem are rigidly connected to the improved Arcan clamping tool in the Arcan clamping subsystem by means of a displacement sensor moving rod support and a displacement sensor body support, respectively;

an indentation laser displacement sensor in the signal detection subsystem is rigidly connected to a stationary outer wall of the voice coil motor in the press-in test subsystem;

a plane reflector and an indentation plane reflector in the signal detection subsystem are adhesively connected to the improved Arcan clamping tool in the Arcan biaxial clamping subsystem and an outer layer of a stationary wedge ring in the press-in test subsystem; and y-direction force sensor in the signal detection subsystem is fastened to a y-direction force sensor base by a force sensor fastening nut.

2. The system for in-situ testing of mechanical properties of materials in static and dynamic load spectra according to claim 1, wherein, the Arcan biaxial clamping subsystem comprises four improved Arcan clamping tools orthogonally arranged and mounted in a common plane, force sensor connection components, a combined guide mechanism and a synchronizing handle;

wherein each of the four improved Arcan clamping tools is arranged in a predetermined position with respect to the other of the four improved Arcan clamping tools, and the four improved Arcan clamping tools have annular grooves of identical width, and geometric circles of four annular grooves share a common circle center, which is a geometric center point of a cruciform test piece to be tested;

the improved Arcan clamping tools are connected to an x-direction force sensor and the y-direction force sensor by means of the force sensor connection components, and are moved circumferentially about a symmetry axis of the four annular grooves of the improved Arcan clamping tools via cylindrical pins;

the adjustments of four relative angles, each of which is formed between a certain linear edge of each of the four improved Arcan clamping tools and an axis of an x-direction ball screw or an axis of a y-direction ball screw are synchronized by the synchronizing handle; and the combined guide mechanism guides motions of the improved Arcan clamping tools in a plane.

3. The system for in-situ testing of mechanical properties of materials in static and dynamic load spectra according to claim 2, wherein, the four improved Arcan clamping tools are symmetrically mounted around the geometric center point of a cruciform test piece, gaps between each two adjacent improved Arcan clamping tools are uniform;

before performing the test, an angle between the cruciform test piece located in a horizontal plane and an axis of an x-direction ball screw or an axis of a y-direction ball screw is adjusted, and during an angle adjustment process, the motions of the four improved Arcan clamping tools are guided by means of the combined guide mechanism having both linear and circular guiding functions;

the four improved Arcan clamping tools have the annular grooves identical to one another, an outer diameter of the cylindrical pin is smaller than the width of the annular groove, the annular groove of the improved Arcan clamping tool and the cylindrical pin are preformed with curved guide surfaces having the same radius of curvature at a center of thickness and height direction, along a circumferential direction of the annular groove of the improved Arcan clamping tool and a circumferential direction of the cylindrical pin, respectively; and the curved guide surface and a hardened steel hall having the same radius of curvature are in spherical contact with each other so as to weaken fractional resistance applied to the improved Arcan clamping tool during a movement thereof in a circumferential direction of the improved Arcan clamping tool during the test process;

the force sensor connection components are mounted to respective improved Arcan clamping tools after the angle adjustment process, respectively, such that an relative angle between the certain linear edge of each of the clamping tools and an axis of the x-direction ball screw or an axis of the y-direction ball screw is maintained by the force sensor connection components after a free setting of the relative angle, so as to implement a loading mode of the cruciform test piece at any acute angle with respect to the axis of the x-direction ball screw or the axis of the y-direction ball screw;

when the relative angle is 0°, the cruciform test piece is subjected to an axial tensile load, which is a biaxial tension test mode, and when the relative angle is an acute angle, a central region of the cruciform test piece has a change in view of a shape of cross-section of the central region due to a shear movement, the cruciform test piece is actually in a biaxial tension-shear plane stress state;

at the same time, an end of the improved Arcan clamping tool for clamping the test piece has a convex structure of a shape conforming to a shape of a circular transition portion of the cruciform test piece, and the convex structure has a thickness larger than that of the cruciform test piece, so as to achieve centering of the cruciform test piece in two orthogonal stretching directions in an arcuate-contact positioning manner; and the synchronizing handle has a pair of symmetrical locating pins having a diameter that is consistent with the width of the annular groove of the improved Arcan clamping tool, and an axial spacing between the pair of locating pins is consistent with a distance between circle centers of semi-circles of adjacent ends of annular grooves of a pair of adjacent improved Arcan clamping tools, such that when angles, each of which is formed between the specific linear edge of each of the four improved Arcan clamping tools and an axis of the ball screw, are adjusted, two synchronizing handles orthogonally arranged ensures that the four improved Arcan clamping tools are simultaneously adjusted with respect to the axis of the ball screw so as to maintain the relative positions of the four improved Arcan clamping tools during the angle adjustment process; and after the angle adjustment process and before performing a test, the synchronizing handles are removed from the four improved Arcan clamping tools.

4. The system for in-situ testing of mechanical properties of materials in static and dynamic load spectra according to claim 1, wherein the combined guide mechanism comprises a linear guide rail pair, and a curved guide rail pair simultaneously guides the respective pair of improved Arcan clamping tools in a stretching direction and in a shear direction of the cruciform test piece, respectively;

when the four improved Arcan clamping tools moves in relative to one another, the relative acute angle between a geometric axis of the cruciform test piece to be tested and the axis of the ball screw is monotonously decreased with the loading process, that is, the motion of the improved Arcan clamping tools is a combination of linear motion and a planar rotational motion surrounding a geometric midpoint of the cruciform test piece;

therefore, the linear guide rail pair guides tensile displacement of the cruciform test piece, and the curved guide rail pair guides shear displacement of the cruciform test piece, and the curved guide rail pair is formed by a curved guide rail and a curved guide rail platform which are connected together by a curved guide rail slider.

5. The system for in-situ testing of mechanical properties of materials in static and dynamic load spectra according to claim 1, wherein the press-in test subsystem comprises the laser transmitter, the voice coil motor, an indentation force sensor, an indentation plane reflector, the laser receiver, an indentation force sensor nut, and a press head clamping unit, wherein the press head clamping unit comprises a press head, a press head positioning pin, a moveable wedge ring, a stationary wedge ring and a stationary stopping ring;

wherein a visible laser of small diameter emitted by the laser transmitter is received in real-time by the laser receiver so as to detect an initial position of the press head in a vertical position;

the accuracy of the position of the press head during use is maintained by a wedge-shaped pre-tightening of the press head;

one bolt of the indentation force sensor at an end thereof is rigidly connected to a moveable end of the voice coil motor by means of an indentation force sensor nut, and the other bolt of the indentation force sensor at the other end thereof is fastened to the stationary wedge ring of the press head clamping unit by threaded connection;

the laser transmitter and the laser receiver are coaxially mounted so as to form a continuous narrow optical path of a visible beam therebetween, and there is a determined fine pitch between the optical path and an upper surface of the cruciform test piece subjected to polishing process so as to detect an absolute position of a tip of the press head in the vertical direction;

in an initial state, the absolute position of the tip of the press head is higher than that of the visible beam, and after the movable end of the voice coil motor performs constant velocity motion or constant acceleration motion, when the tip of the press head interferes with the visible beam, an optical signal of the visible beam cannot be detected by the laser receiver;

based on the feedback signal from the laser receiver, the voice coil motor continues to perform a quasi-static constant velocity motion or the constant acceleration motion with a determined stroke under a control of sequence voltage so as to achieve a static press-in test or an impact press-in test of the cruciform test piece;

a cylindrical shank end of the press head and an inner cylindrical surface of the moveable wedge ring are provided with through holes having identical diameters, in a direction perpendicular to an axial direction of the press head and in a direction perpendicular to an axial direction of the moveable wedge ring, respectively;

the press head positioning pin is interference-fitted in the through holes such that a relative position between the press head and the moveable wedge ring is fixed;

and the moveable wedge ring and the stationary wedge ring are positioned by conical surfaces thereof with the same inclination, and a wide end face of the moveable wedge ring is in surface contact with the stationary stopping ring, and a narrow end face of the stationary wedge ring is rigidly connected to the stationary stopping ring by threaded connection such that the position of the press head is precisely achieved by wedge positioning.

6. The system for in-situ testing of mechanical properties of materials in static and dynamic load spectra according to claim 1, wherein the biaxial fatigue test subsystem comprises a set of orthogonally arranged x, y-direction piezoelectric drives;

the x-direction piezoelectric drive comprises an x-direction piezoelectric stack and an x-direction fatigue flexible hinge;

the y-direction piezoelectric drive comprises a y-direction piezoelectric stack and a y-direction fatigue flexible hinge;

and the x-direction fatigue flexible hinge and the y-direction fatigue flexible hinge are both of symmetrical arc transition type flexible structure;

x and y-direction piezoelectric drives are orthogonally mounted on circumferential outer edges of the improved Arcan clamping tools; and the x-direction piezoelectric stack and the y-direction piezoelectric stack are always under compression, and elastic elongation and recovery thereof provide an alternating stress having stress ratio of 0 for the cruciform test piece to be tested;

an enveloped structure of the x-direction fatigue flexible hinge and the y-direction fatigue flexible hinge comprises three sets of flexible thin walls which are arranged in parallel;

in a direction perpendicular to a central axis of the x-direction piezoelectric stack or the y-direction piezoelectric stack, the flexibility of the x-direction fatigue flexible hinge or the y-direction fatigue flexible hinge is gradually reduced until it can be regarded as a rigid body;

when applying alternating voltages of identical frequency and equal amplitude to the x-direction piezoelectric stack and the y-direction piezoelectric stack, the x-direction fatigue flexible hinge and the y-direction fatigue flexible hinge perform corresponding angular displacements along a flexible joint at their inner walls, the cruciform test piece is also subject to controllable alternating loads of the identical frequency and equal amplitude.

7. The system for in-situ testing of mechanical properties of materials in static and dynamic load spectra according to claim 1, wherein the biaxial pre-tension loading subsystem is achieved as follows:

through a swallowtail wedge structure, an x-direction guide rail slider floats above an x-direction linear guide rail rigidly connected to the base;

similarly, a y-direction guide rail slider also floats above a y-direction linear guide rail through a swallowtail wedge structure;

a y-direction screw support seat and the y-direction linear guide rail are rigidly mounted on a y-direction fixing base by threaded connection;

in addition, a y-direction screw nut is sleeved on a flange of an x-direction ball screw and rigidly mounted on the x-direction guide rail slider together with an x-direction screw nut bracket by threaded connection;

an output shaft of a y-direction servo motor and a gear shaft of a y-direction drive spur gear are respectively embedded in a through hole of a flexible coupling so as to transmit an output torque motion of the y-direction servo motor;

a flat key is embedded in a key groove of a worm shaft, and positioning faces on both sides of the flat key are in surface contact with spur gear comprising an x-direction spur gear I, an x-direction spur gear II, a y-direction spur gear I and a y-direction spur gear II; and a positioning pin is interference-fitted in an inner hole formed at an axial end of the worm shaft and perpendicular to an axial direction of the worm shaft so as to limit axial movements of the spur gears comprising the x-direction spur gear I, the x-direction spur gear II, the y-direction spur gear I and the y-direction spur gear II;

a wormwheel is sleeved on an axial end of an x-direction ball screw or a y-direction ball screw through its inner bore and a wormwheel positioning pin so as to limit rotation freedom thereof; and a bearing inner bore of an outer positioning bearing is interference-fitted on a gear shaft of an x-direction drive spur gear or the y-direction drive spur gear, and a bearing outer ring of the outer positioning bearing is interference-fitted within a bearing housing hole of a worm shaft base, and a retaining ring of the outer positioning bearing is in surface contact with an retaining surface of an outer wall of the worm shaft base so as to limit the axial movement of the gear shaft of the x-direction drive spur gear or the y-direction drive spur gear;

a pair of x-direction ball screws have axes that are coaxial to each other and that are perpendicular to geometric axes of the x-direction spur gear I, the x-direction spur gear II and the x-direction drive spur gear, and both have a helix shape that is right-handed; and the single-stage worm and wormwheel reduction mechanism consisting of the worm and the wormwheel has a gear ratio of 40.

8. The system for in-situ testing of mechanical properties of materials in static and dynamic load spectra according to claim 1, wherein the signal detection subsystem comprises an x-direction force sensor, a y-direction force sensor, a horizontal laser displacement sensor I, a horizontal laser displacement sensor II, a plane reflector, an indentation laser displacement sensor, an indentation force sensor, an indentation plane reflector, a contact displacement sensor I, a contact displacement sensor II, a displacement sensor moving rod support and a displacement sensor body support, wherein the horizontal laser displacement sensor I is mounted such that a symmetry line, between an incident light and a reflected light of the horizontal laser displacement sensor I is orthogonal to the contact displacement sensor I, and the horizontal laser displacement sensor II is mounted such that a symmetry line between an incident light and a reflected light of the horizontal laser displacement sensor II is orthogonal to the contact displacement sensor II;

a geometric axis of the x-direction force sensor forms an acute angle with the symmetry line between the incident light and the reflected light of the horizontal laser displacement sensor I and also forms an acute angle with a geometric axis of the contact displacement sensor I, and a geometric axis of the y-direction three sensor forms an acute angle with the symmetry line between the incident light and the reflected light of the horizontal laser displacement sensor II and also forms an acute angle with a geometric axis of the contact displacement sensor II.

9. The system for in-situ testing, of mechanical properties of materials in static and dynamic load spectra according to claim 1, wherein the support and adjustment subsystem comprises a gantry column, the two-degree-of-freedom electric moving platform for the laser receiver, the guide mechanism support block, a base, the two-degree-of-freedom electric moving platform for the laser transmitter and the two-degree-of-freedom electric moving platform for the voice coil motor, wherein the base is used to support the biaxial pre-tension loading subsystem and the biaxial fatigue test subsystem; and the two-degree-of-freedom electric moving platform for the laser receiver, the guide mechanism support block, the two-degree-of-freedom electric moving platform for the laser transmitter and the two-degree-of-freedom electric moving platform for the voice coil motor rigidly connected to the gantry column adjust the positions of the laser receiver, the laser transmitter and the voice coil motor in the press-in test subsystem in real time, respectively.

10. A method for in-situ testing of mechanical properties of materials in static and dynamic load spectra, a stress-strain decoupling method for an Arcan biaxial clamping subsystem and a biaxial pre-tension loading subsystem, comprising:

a central region and a gauge portion of a cruciform test piece are simplified to a unit body with uniform deformation;

when calculating an actual stress and strain caused by each component of loads suffered by the cruciform test piece under a tension-shear plane stress state and a biaxial tension plane stress state, by means of principle of superposition, combined effects of a tension-shear load and a biaxial tension load on the stress and strain of the cruciform test piece are decoupled into a vector coupling superposition of a stress-strain constitutive relation under each single load;

taking an elastic elongation, a plastic flow and a cross-section change of a material, in a target load acting direction, caused by other class of loads into consideration, a deformation behavior of the unit body of a simplified model in the target load acting direction is quantitatively described so as to obtain a relationship between the stress and strain under the target load and a known coupling load and a displacement, the decoupling method comprising:

for a tension-shear composite stress state, in order to calculate an actual tensile strain and an actual shear strain of the cruciform test piece under an external load, which forms an acute angle to an axial direction of the cruciform test piece, establishing a simplified regular hexahedron model, wherein the simplified regular hexahedron model characterizes the gauge portion of the cruciform test piece, wherein an offset angle formed between an initial geometric axis of the regular hexahedron and a stretching direction is a known parameter, and a length, a width and a height of the regular hexahedron respectively correspond to a length, a width and a thickness of the gauge portion of the cruciform test piece;

quantitatively calculating an angle between a geometric axis of a rhombohedron and the initial geometric axis of the regular hexahedron, wherein under the external load coaxial with the stretching direction, the regular hexahedron model is changed to the rhombohedron; and verifying, wherein an actual tensile stress and strain and a shear stress and strain of a cruciform test piece are directly collected and calculated by force sensors and displacement sensors, respectively, and then a respective tensile stress-strain curve and a respective shear stress-strain curve are decoupled, and then the decoupling method can be verified by three-dimensional strain analysis of a digital speckle measurement technique;

for a biaxial tension mode, a central region of the cruciform test piece is stretched evenly under an action of plane stress, whereas a width of a parallel beam section gradually decreases in a load acting direction, a quantitative relationship between a deformation distribution and a load effect of the cruciform test piece is established by simulation analysis and image test method.

* * * * *

UNITED STATES PATENT AND TRADEMARK OFFICE
CERTIFICATE OF CORRECTION

PATENT NO. : 10,809,169 B2
APPLICATION NO. : 16/316321
DATED : October 20, 2020
INVENTOR(S) : Zhichao Ma et al.

Page 1 of 1

It is certified that error appears in the above-identified patent and that said Letters Patent is hereby corrected as shown below:

On the Title Page

In the Abstract:
At item (57), page 2, Line 4, the word "three" should read -- force --.

In the Claims

At Column 26, Claim number 3, Line number 35, the word "hall" should read -- ball --.

At Column 26, Claim number 3, Line number 37, the word "fractional" should read -- frictional --.

At Column 30, Claim number 8, Line number 29, the word "three" should read -- force --.

Signed and Sealed this
Fifth Day of January, 2021

Andrei Iancu
*Director of the United States Patent and Trademark Office*